(12) United States Patent
Leigh et al.

(10) Patent No.: US 10,677,999 B2
(45) Date of Patent: Jun. 9, 2020

(54) DUPLEX-MODULO OPTICAL BLINDMATE CONNECTOR HAVING A CARRIER PLATE AND CONNECTOR HOUSING

(71) Applicant: Hewlett Packard Enterprise Development LP, Houston, TX (US)

(72) Inventors: Kevin B. Leigh, Houston, TX (US); John Norton, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/109,184

(22) Filed: Aug. 22, 2018

(65) Prior Publication Data

US 2020/0064560 A1 Feb. 27, 2020

(51) Int. Cl.
*G02B 6/38* (2006.01)

(52) U.S. Cl.
CPC ......... *G02B 6/3878* (2013.01); *G02B 6/3825* (2013.01); *G02B 6/3869* (2013.01)

(58) Field of Classification Search
CPC .. G02B 6/3825; G02B 6/3875; G02B 6/3897; G02B 6/3891; G02B 6/3831; G02B 6/3869; G02B 6/3878
USPC .................................................. 385/88, 135
See application file for complete search history.

(56) References Cited

U.S. PATENT DOCUMENTS

| | | | | |
|---|---|---|---|---|
| 5,016,968 A * | 5/1991 | Hammond | ........... | G02B 6/3831 385/78 |
| 5,076,656 A * | 12/1991 | Briggs | ................ | G02B 6/3807 385/60 |
| 5,123,071 A * | 6/1992 | Mulholland | ........ | G02B 6/3831 385/53 |
| 5,325,455 A * | 6/1994 | Henson | ................ | G02B 6/3817 385/137 |
| 6,019,521 A * | 2/2000 | Manning | .............. | G02B 6/3869 385/56 |
| 6,200,040 B1 * | 3/2001 | Edwards | .............. | G02B 6/3806 385/134 |
| 6,247,850 B1 * | 6/2001 | Edwards | .............. | G02B 6/3806 385/137 |
| 6,302,596 B1 | 10/2001 | Cohen et al. | | |
| 6,402,393 B1 | 6/2002 | Grimes et al. | | |
| 6,443,627 B1 * | 9/2002 | Anderson | ............ | G02B 6/3825 385/56 |
| 6,827,506 B2 * | 12/2004 | Chen | .................... | G02B 6/4206 385/35 |
| 6,932,514 B2 | 8/2005 | Anderson et al. | | |
| 7,182,524 B2 * | 2/2007 | Kramer | ................ | G02B 6/3825 385/53 |
| 7,311,539 B2 | 12/2007 | Pepe et al. | | |

(Continued)

*Primary Examiner* — Akm E Ullah
(74) *Attorney, Agent, or Firm* — Hewlett Packard Enterprise Patent Department

(57) ABSTRACT

Systems and methods are provided for duplex-modulo connector comprising a carrier plate receiving a duplex ferrule. The carrier plate can include an entry slot that receives the duplex ferrule. The entry slot further includes neck spring leaves, and base spring leaves that support stabilizing the duplex ferrule and absorbing movement to support spring floating of the duplex ferrule. The duplex ferrule can include a receptacle connector housing, or a plug connector housing for aligning the duplex ferrule for blindmating with a complimentary duplex ferrule, wherein the carrier plate is coupled to the housing.

11 Claims, 15 Drawing Sheets

(56) References Cited

U.S. PATENT DOCUMENTS

| | | | | |
|---|---|---|---|---|
| 8,152,546 B2* | 4/2012 | Gosling | ............... | H01R 25/164 439/215 |
| 9,823,428 B1* | 11/2017 | Goldstein | ............ | G02B 6/3879 |
| 2001/0019645 A1* | 9/2001 | Edwards | ............... | G02B 6/3802 385/56 |
| 2003/0059167 A1* | 3/2003 | Chiu | .................... | G02B 6/3825 385/53 |
| 2008/0252147 A1* | 10/2008 | Gosling | ............... | H01R 25/164 307/80 |
| 2017/0184798 A1 | 6/2017 | Coenegracht | | |

* cited by examiner

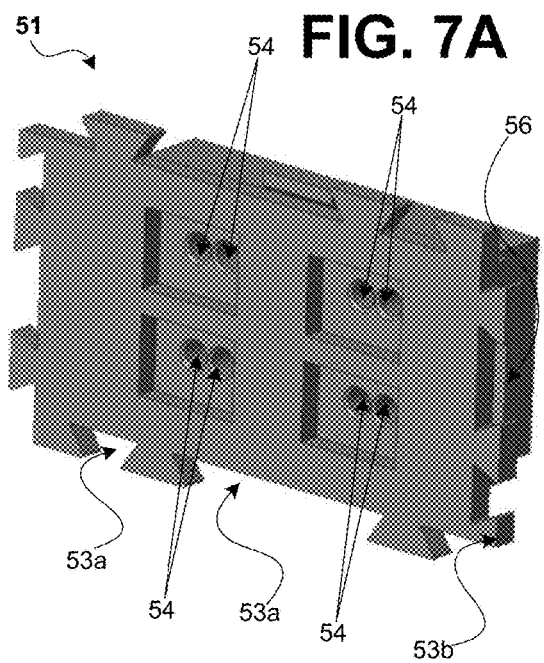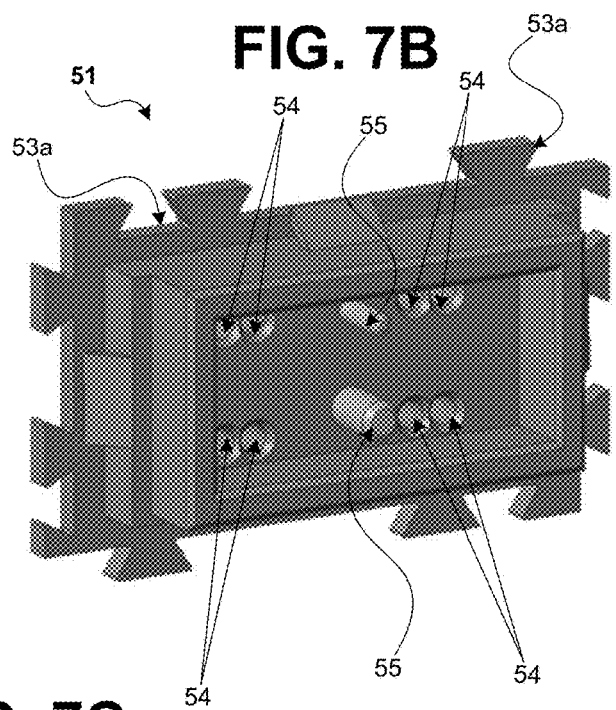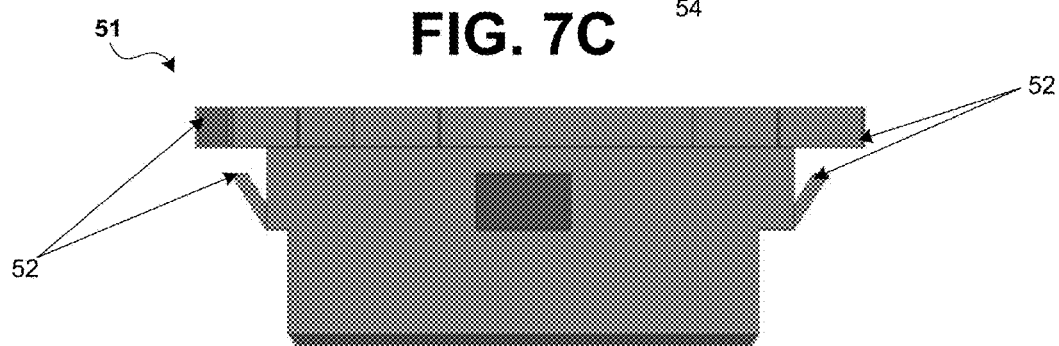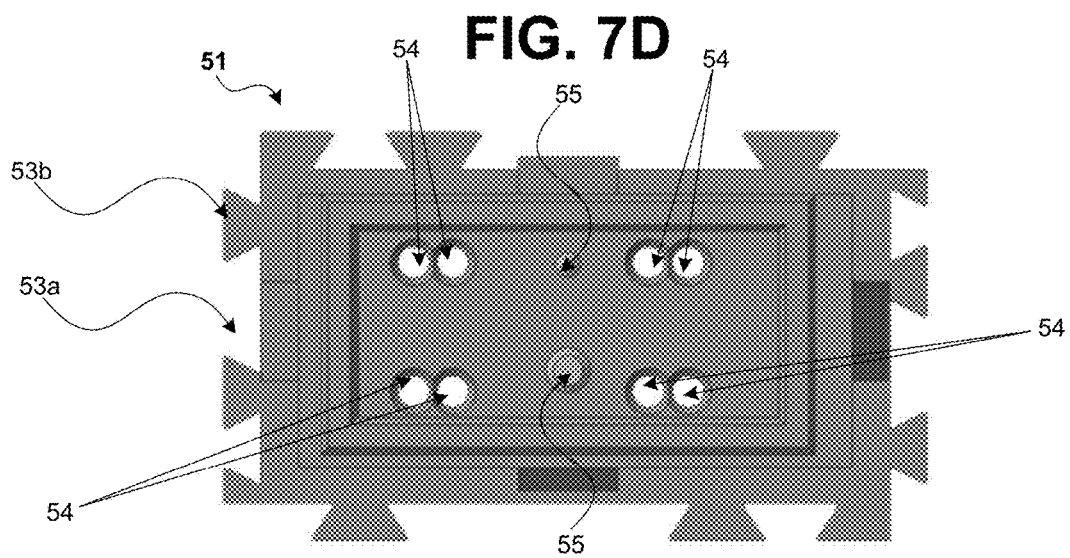

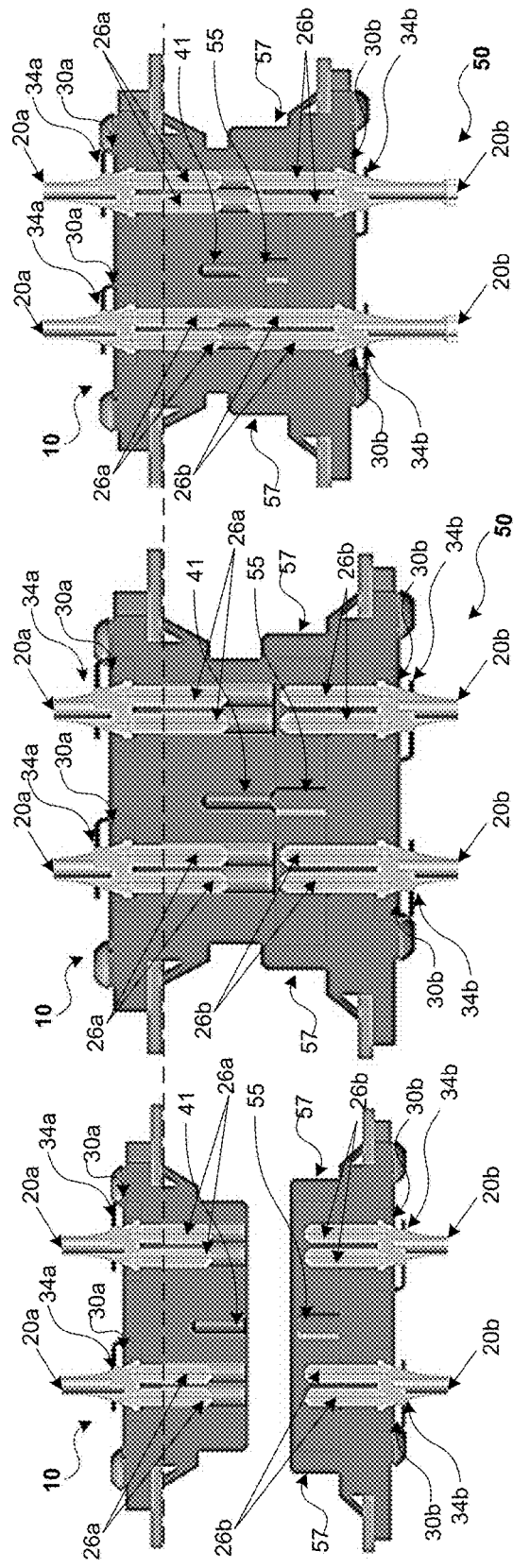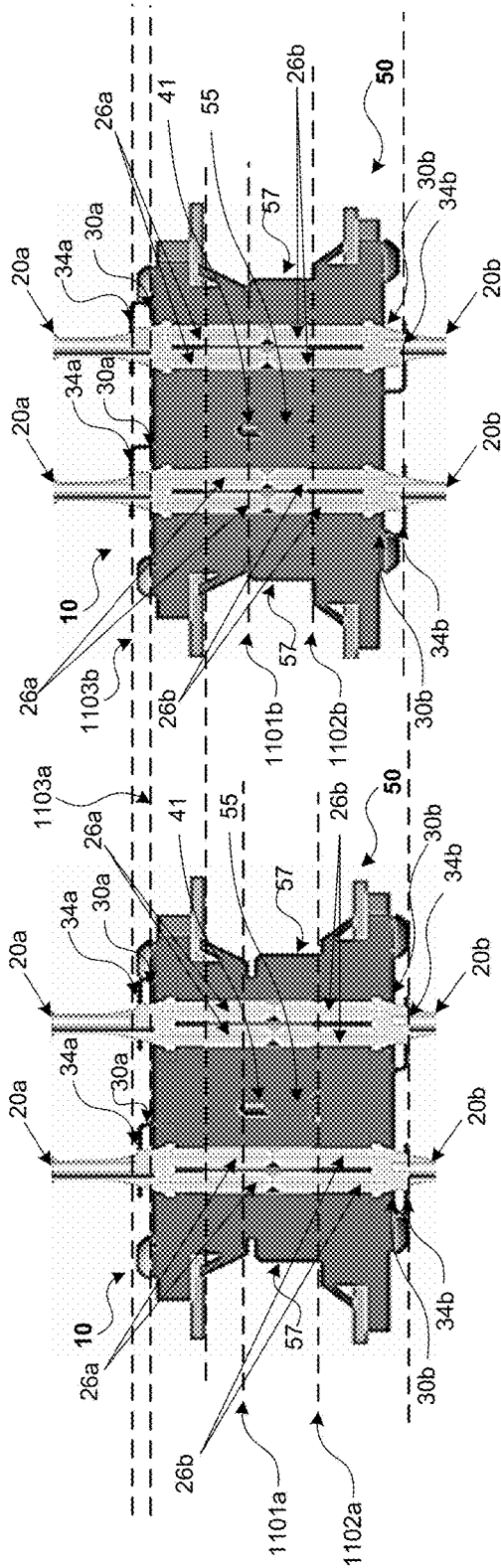

DUPLEX-MODULO OPTICAL BLINDMATE CONNECTOR HAVING A CARRIER PLATE AND CONNECTOR HOUSING

DESCRIPTION OF RELATED ART

Optical data systems or more generally, optical communication systems including, but not limited to, those used in large data centers, often must accommodate large amounts of data using a finite number of optical interconnects. In some optical communications systems, optical fibers are used to interconnect system elements. Increasing the amount of data handled by the optical communications system may lead to a demand for optical fiber interconnects that exceeds the available number of optical fibers in the existing optical communications system. In many cases, more optical fibers are added to accommodate the demand, thereby creating a high-density connectivity having the large number of optical fibers.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIGS. 7A-7D are multiple perspective views of an example housing for the duplex-modulo optical blindmate connector configured as the plug for the blindmating shown in FIGS. 1A-1D, according to some embodiments.

FIGS. 11A-11E are side views of an example mating sequence for blindmating the duplex-modulo optical blindmate connectors in FIGS. 1A-1D, according to some embodiments.

Figure 1A:
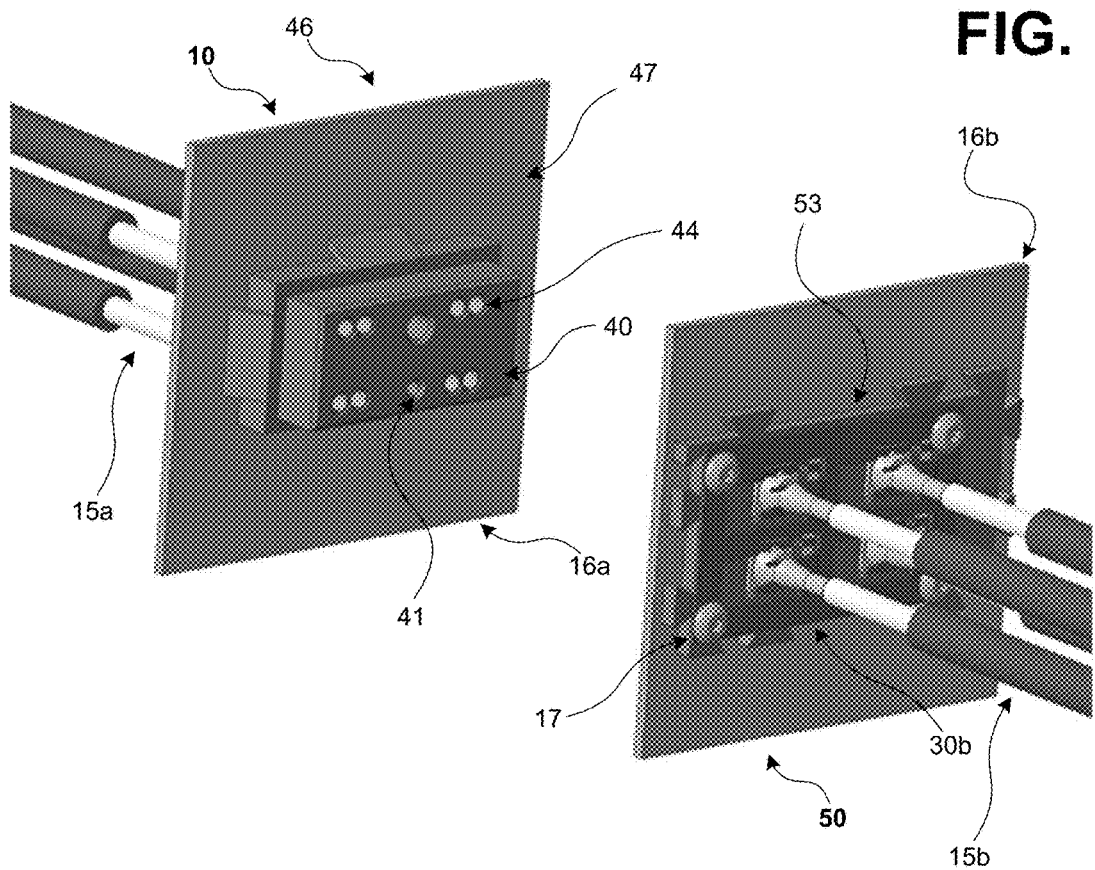
FIGS. 1A-1D are multiple perspective views of an example blindmating of a duplex-modulo optical blindmate connector configured as a receptacle and a duplex-modulo optical blindmate connector configured as a plug, according to some embodiments.

The figures are not exhaustive and do not limit the present disclosure to the precise form disclosed.

DETAILED DESCRIPTION

Various embodiments described herein are directed to an optical blindmate connector designed to allow an optical fiber pair, or a duplex ferrule (housing the two individual fibers), to be coupled to blindmate connectors. For purposes of discussion, the various systems and techniques of the disclosed embodiments may be referred to as duplex-modulo optical blindmate connectors. The disclosed duplex-modulo optical blindmate connectors are specifically designed to form the various different optical connections that may be present in a fabric system using duplex ferrules. Accordingly, duplex-modulo optical blindmate connectors are configured such that the optical connections formed are scalable at a finer level of granularity (e.g., through the use of individual fiber pairs), allowing the fabric to have a greater design flexibility that cannot be achieved using connectors designed for high-density ports (e.g., ports having multiples of 12 or 16 fibers) which are commonly used in existing fabric systems.

Many applications of optical interconnection networks may require complex fabric topologies to interconnect multiple compute nodes, memory nodes, I/O nodes via fabric nodes (e.g., switches). Optical connectivity consisting of optical transceivers, optical connectors, and optical cables, are fundamental to form the connections which comprise the optical network fabric. Some legacy optical connectivity techniques use electrical connectivity within the system, and optical connectivity across systems. Current systems may commonly use optical connectivity within systems, as well as optical connectivity across systems. However, there is an emergence of optical connectivity within systems, which further comprises optical integrated chips. Optical integrated chips can be described as optically co-packaged integrated circuits (IC), such as application-specific integrated circuits (ASICs). Some optically co-packaged ASICs are implemented in systems that can provide scalable bandwidth fabric, low latency, and scalable fabric size. With the use of optically co-packages ASICs, for instance, the optical signals may be coupled directly to the ASIC packages, which requires some modularity in the optical connectors. In addition, optical connectivity is advancing towards more sophisticated techniques for achieving high bandwidth within each optical fiber, including wave-division multiplexing (WDM), to enable the use of fewer fibers for the same bandwidth compared to single wavelength optical signals per fiber.

High-density optical connectivity can be generally described as a brute force approach to achieve high bandwidth, by using increasingly large numbers of fibers on each port. As an example of a developing alternative, multiple signal wavelengths can be supported on each fiber (e.g., combining transmit signal wavelength sets and receive signal wavelength sets on a single fiber). Thus, high bandwidth can be realized, while minimizing the fiber count egressing an ASIC package. However, many existing optical connectivity components, including the existing optical blindmate connectors, are designed to support the aforementioned high-density techniques, rather than these emerging techniques. For example, some currently used optical blindmate connectors support high-density ferrules, where the denseness is due to compacting as many fibers as possible (e.g., up to 64 fibers) in each ferrule in order to increase bandwidth. Higher fiber count ferrules have negative tradeoffs, such as higher optical losses and higher cost. In addition, complex, bulky and expensive fiber assemblies are needed to connect among multiple higher fiber count ferrules.

Additionally, many existing optical communication systems use high fiber count connectors for interoperability with the high fiber count ferrules alluded to above. For instance, optical blindmate connectors are a typical form of connectors used for coupling these high-density ferrules, and may be used for systems to be modularly installed and/or serviced in system enclosures. As an example, blindmate connectors may be used where the front system (e.g., compute nodes) and rear systems (e.g., switch nodes) are orthogonally coupled. Another common form of connectors are faceplate connectors. Faceplate connectors, for example, can be used for external optical cables to interconnect systems across system enclosures and racks. Existing blindmate connectors, and faceplate connectors, are commonly high-density in a manner similar to the high-density ferrules, and house multiple optical fibers (e.g., multiples of 12 or 16 optical fibers) to support connectivity amongst the large number of optical fibers. Also, like high-density ferrules, high-density connectors can have negative tradeoffs that include higher optical losses and higher cost.

However, the duplex-modulo optical blindmate connectors disclosed herein are designed to work with optical connectivity techniques that not only achieve high bandwidth (by using multiple wavelengths), but can also improve overall performance (by independently mating fewer fiber ferrules) over the high-density ferrules and high-density connectors described above. In most cases using high-density connectivity, each fiber carries an optical signal modulated with a wavelength. Similarly, the optical blindmate connectors are configured to rigidly house as many fibers as possible, supporting these high-density ferrules from low lane-count optical transceivers. Although increased bandwidth can be realized, high-density ferrules may experience certain design trade-offs, such as high optical signal power loss (e.g., insertion loss). In contrast, as alluded to above, the duplex-modulo optical blindmate connectors allow for the use of duplex ferrules that can reduce the insertion loss associated with high fiber count ferrules. However, high bandwidth can still be achieved using duplex-modulo optical blindmate connectors, as each individual optical fiber can be configured for carrying multiple transmit (Tx) or receive (Rx) optical signal wavelengths.

Figure 1B:
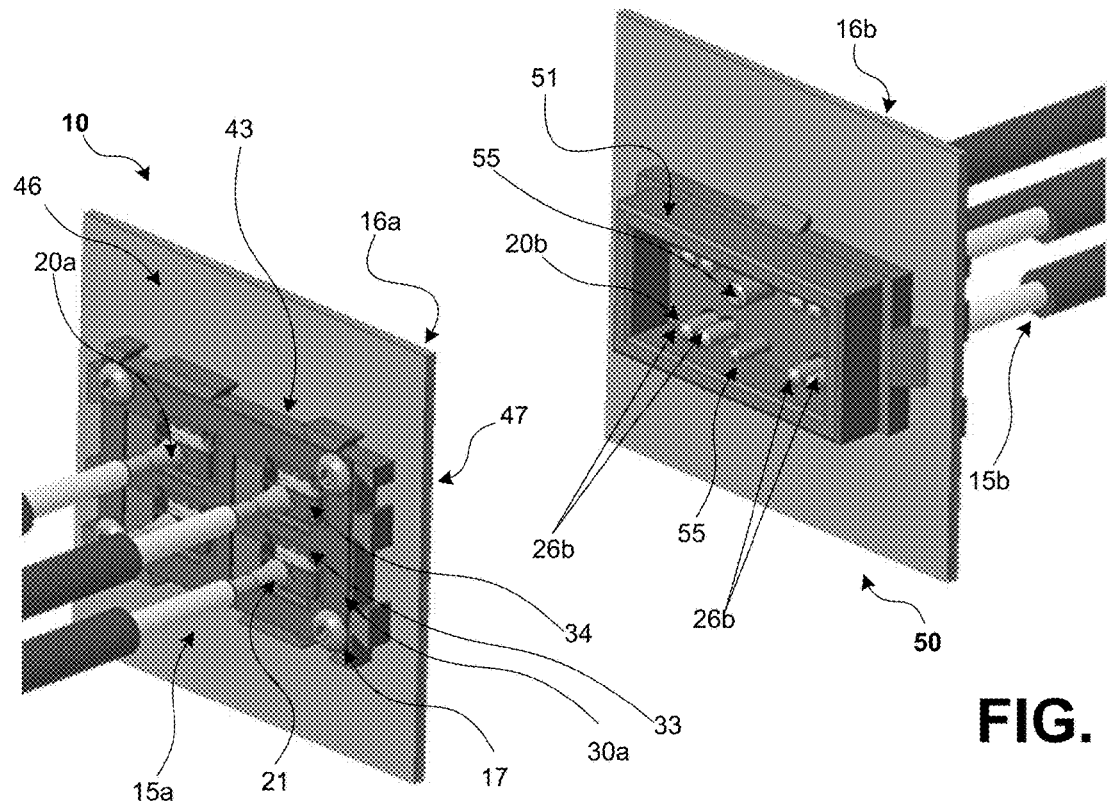
Figure 1C:
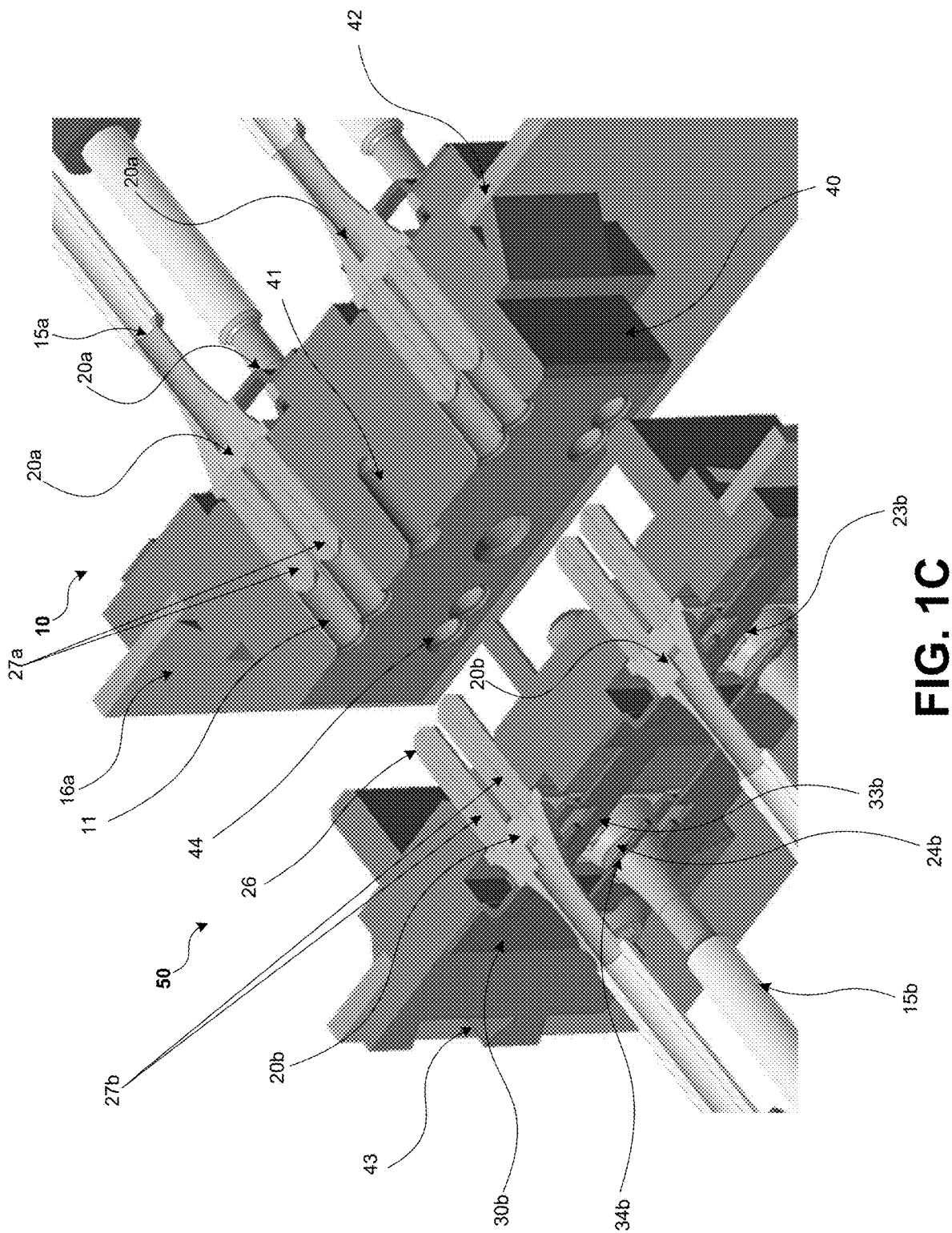
Figure 1D:
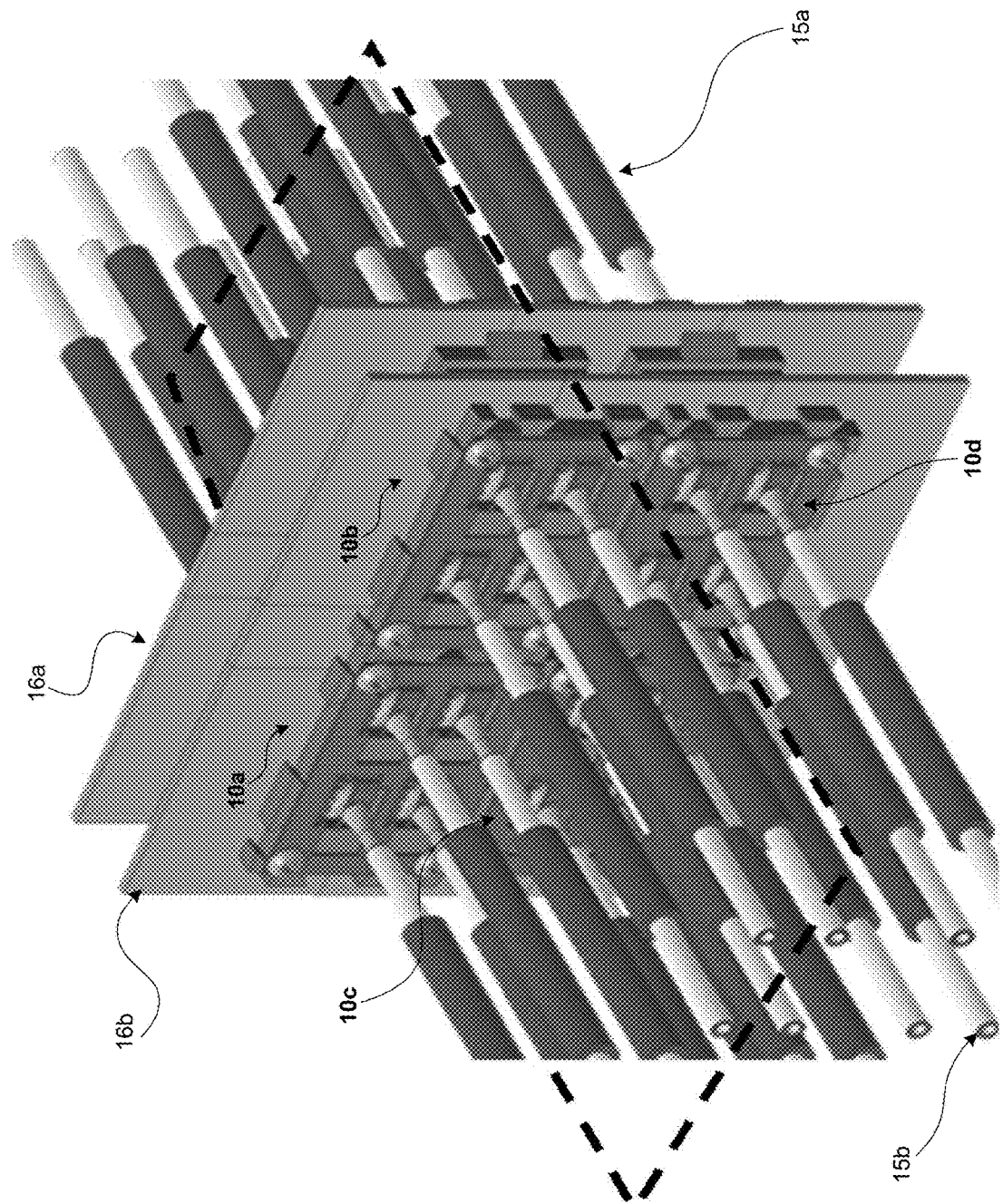

FIGS. 1A-1D are multiple perspective views of an example blindmating using the duplex-modulo optical blindmate connectors 10, 50 (identified individually as a first duplex-modulo optical blindmate connector 10 and a second duplex-modulo optical blindmate connector 50), in accordance with the embodiments. The duplex-modulo optical blindmate connectors 10, 50 can be opto-mechanical devices used to align and couple at least two optical fibers together, thereby providing a means for attaching to (and decoupling from) an optical component such as a transceiver, in an optical communication system. Each of FIGS. 1A-1D illustrate a first duplex-modulo optical blindmate connector 10 (identified individually as first duplex-modulo optical blindmate connectors 10a, 10b, 10c, and 10d as illustrated in FIG. 1D) that is configured as a receptacle, hereinafter referred to as the receptacle. Additionally, a second duplex-modulo optical blindmate connector 50, which is configured as a plug, is shown in each of FIGS. 1A-1D. The duplex-modulo optical blindmate connector 50, is hereinafter referred to as the plug. FIGS. 1A-1D can be generally described as showing a sequence in blindmating the receptacle (e.g., the first duplex-modulo optical blindmate connector 10) to the plug (e.g., the second duplex-modulo optical blindmate connector 50). FIG. 1A shows the receptacle and plug separated and initially positioned for joining the plug and receptacle (e.g., connectors 10, 50) together for coupling. FIG. 1D illustrates the conclusion of the blindmating sequence, with the receptacle and plug connected in a fully mated position (forming a fiber interconnection). The plug is structured with male portions, or extended components, arranged on an exterior surface that will cooperate with the interiorly conical, or female portions, of the receptacle that assists in stably joining the two connectors together during blindmating.

The optical communication system disclosed herein, operates in accordance with the emerging optical connectivity techniques, as alluded to above. For example, FIG. 1C illustrates individual optical fiber pairs 27a, 27b. Accordingly, an optical communication system using the disclosed duplex-modulo optical blindmate connectors 10, 50, can convey optical signal wavelengths for Tx and optical signal wavelengths for Rx on each optical fiber 27a, 27b. As seen in FIG. 1C, a pair of optical fibers 27a installed at the receptacle is carried by a duplex ferrule 20a. Similarly, a pair of optical fibers 27b installed at the plug is carried by a duplex ferrule 20b.

Still referring to FIG. 1C, multiple individual optical fibers 27a, 27b (enabling duplex transmission) that are together in a single wire/cable are referred to hereinafter as duplex optical fibers 15a, 15b. A cable, or duplex optical fibers 15a, 15b, can represent a fabric port that is the modulo connection point to form the fabric connectivity of the optical communication system. As previous described, optically co-packaged ASICs can have multiple duplex fibers 15a, 15b modularly attached, where each duplex fiber pair is a fabric port. For purposes of illustration, the duplex fibers 15a installed in receptacle can be a fabric port of an ASIC which requires a connection to another fabric port of a second ASIC. The other port can be comprised by the duplex fibers 15b that are installed in plug. In some instances, the ASIC corresponding to receptacle, and the second ASIC corresponding to plug can be physically located in different systems. Alternatively, in some cases, these systems may be co-located within an enclosure. The systems can be optically interconnected by blindmating receptacle with plug, as illustrated in FIGS. 1A-1D. A system as described herein, may be a compute node, a memory node, and I/O node, or a fabric node (e.g., switch). The duplex fibers 15a, 15b and duplex ferrules 20a, 20b are described in greater detail in reference to FIGS. 3A-3C.

Referring now to FIG. 1A, the receptacle and plug can be portions of larger system bulkheads. Generally, a bulkhead can serve as a terminating structure (e.g., terminating multiple optical fibers) that can be mounted to a networking equipment, like a switch system. In the example of FIG. 1A, the receptacle and the plug are configured as four-duplex connectors. Restated, blindmating receptacle with plug, as seen in FIG. 1C, connects each of the four-duplex ferrules 20a installed at the receptacle to a corresponding one of the four-duplex ferrules 20b installed at the plug, respectively. It should be appreciated that although a four-duplex configuration is described for the purposes of illustrating the duplex-modulo optical blindmate connectors 10, 50, other configurations (having varying numbers of duplex ferrules 20a, 20b installed therein) can be used in other embodiments.

Figure 3A:
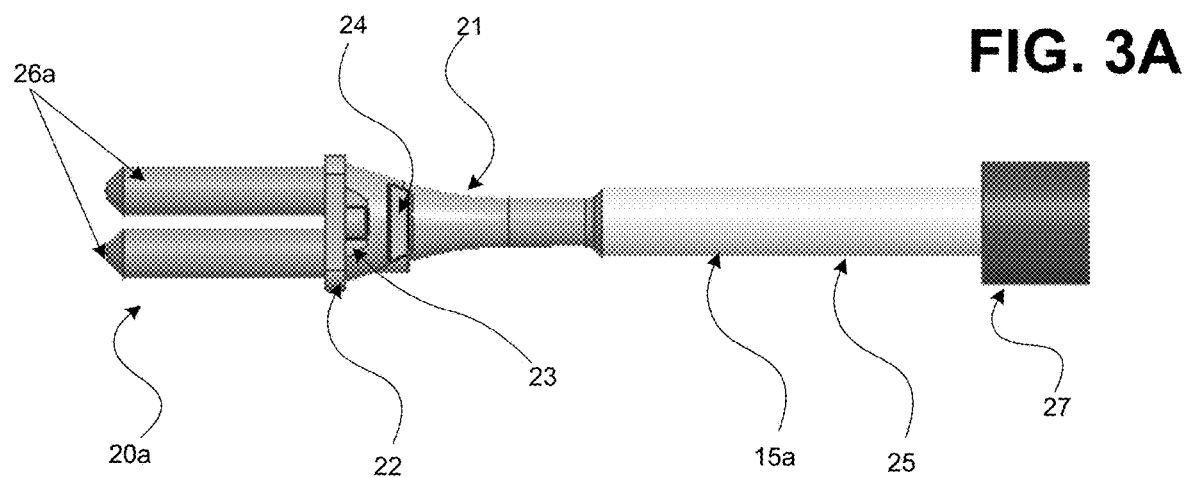
FIGS. 3A-3C are multiple perspective views of example duplex ferrules to be installed in the duplex-modulo optical blindmate connectors shown in FIGS. 1A-1D, according to some embodiments.
Figure 3B:
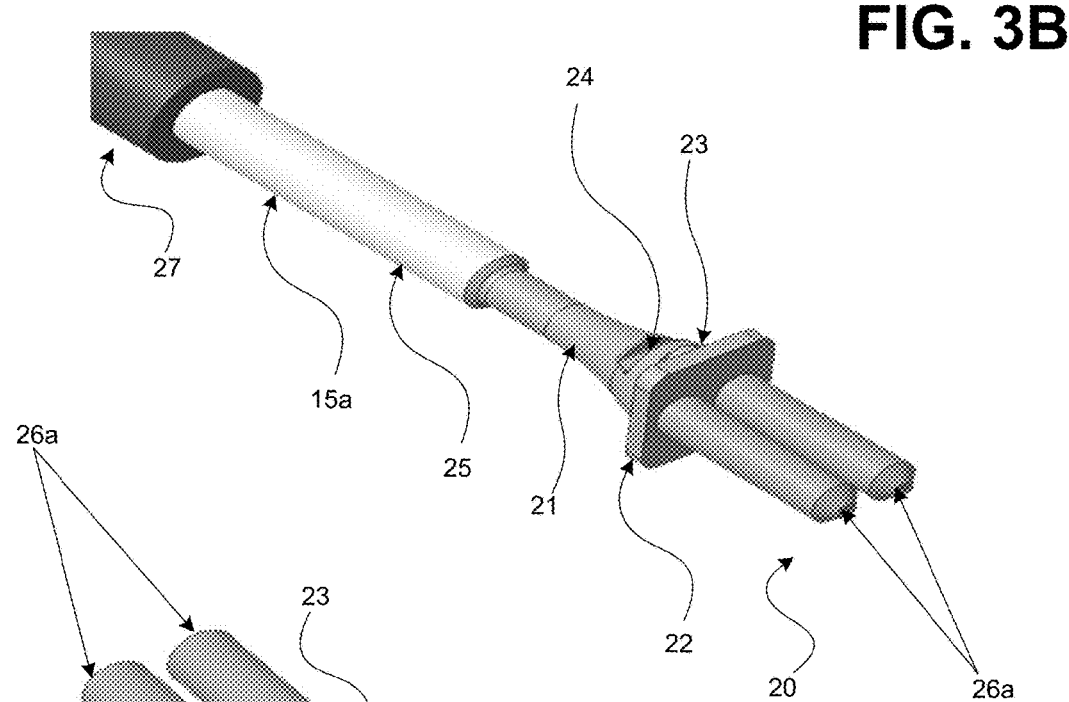
Figure 3C:
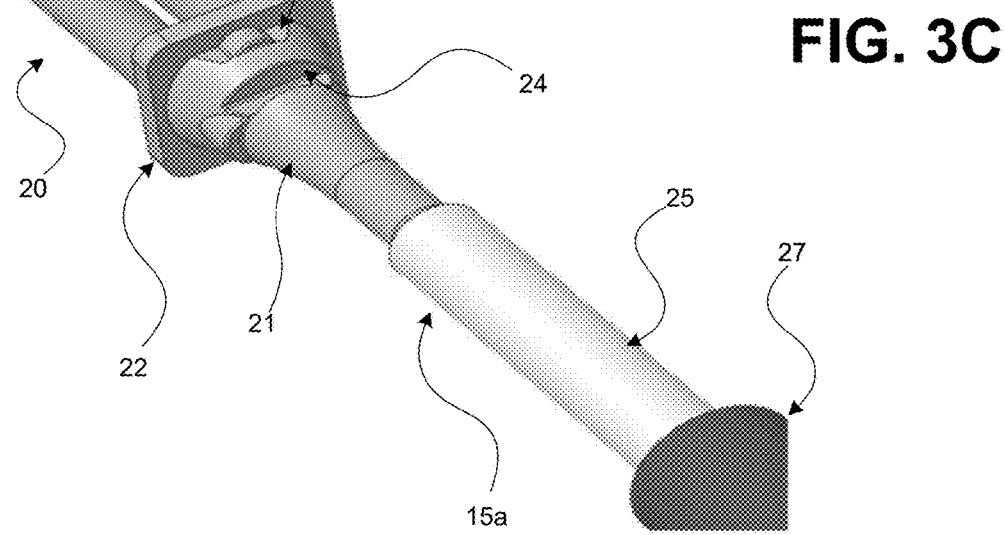

FIG. 1C shows a cross-sectional view of the duplex ferrules 20a, 20b installed in the receptacle and plug, respectively. FIGS. 3A-3C illustrate multiple perspective views, which prominently show a duplex ferrule 20a and a duplex fiber 15a in greater detail. The duplex ferrule 20a has a unique structure in accordance with the embodiments. As seen in FIG. 3B, the duplex ferrule 20a includes a pair of single-fiber ferrules 26a. Each single-fiber ferrule 26a can carry the individual optical fiber (shown in FIG. 1C). The lower number of optical fibers in duplex ferrule 20a is in contrast to many commonly used high fiber count ferrules (e.g., 12 fibers, 24 fibers arranged in a linear array) used in blindmate connector housings, as alluded to above.

Furthermore, regarding the duplex fiber 15a, FIG. 3A shows an optical cable 27 (e.g., a multi-fiber cable) extending to flange 21. Typically, a fiber optic cable 27 can be constructed to include multiple layers, such as the core, the cladding, the buffer, the strength member and the outside jacket 25. An optical fiber may be fragile with the potential to be easily broken, thus at least the jacket 25 can be a portion of the optical cable 27 that is used to provide protection for the cladded fiber core within the optical cable 27. The flange 21 can protect the tips of the individual optical fibers of the duplex fiber 15a that extend from the jacket 25, as it feeds through to reach the duplex ferrule 20a. The flange 21 may be made of metal or plastic.

FIG. 3B illustrates the duplex ferrule 20a as comprising two small and substantially cylindrical structures, or the single-fiber ferrules 26a, that are arranged parallel to each other. The duplex ferrule 20a can be used to mount and align the tips of the individual optical fibers held therein during coupling. As shown, a duplex optical fiber cable 27 terminates at the end of the duplex ferrule 20a. Thus, for purposes of discussion, the portion including the tip of the optical fiber, or the interfacing end of the duplex ferrule 20a can be referred to as the terminal side of the duplex ferrule 20a. In some cases, the terminal side includes an optical lens that can further facilitate optical alignment. The opposing end of the duplex ferrule 20a can be referred to as the distal side. The distal side of the duplex ferrule 20a can be generally described as including the ferrule mating features that facilitate the blindmating shown in FIGS. 1A-1D.

In some embodiments, the duplex ferrule 20a allows independent mating of each of the two single-fiber ferrules 26a. Accordingly, the duplex-modulo optical blindmate connectors 10, 50 can be used to mate these single-fiber ferrules 26a in a pair by independently mating the duplex ferrule 20a. It should be understood in optical communications that certain principles are critical to achieving efficient fiber optic connections, including, but not limited to: fiber core alignment; and fiber core protrusion dimension for physical-contact type mating. Optical interconnections formed using the duplex ferrule 20a (having a low number of fibers) can improve the realization of these principles, thereby providing improvement over existing high-density blindmate connectors that mate a large number of fibers. For example, blindmating high fiber count ferrules may increase bandwidth, but also increase the potential of a fiber core misalignment, or a poor optical performance. A pair of misaligned fiber cores can cause higher insertion loss and higher compression stress on protruded fiber core for physical-contact type ferrules. Alternatively, implementing connectivity with independently installable duplex ferrules 20a increases the overall reliability of the connectors, and reduces insertion loss. Moreover, the use of duplex ferrules 20a (which in turn reduces the fiber count) can help mitigate high costs associated with employing a large number of fibers, since individual duplex ferrules can be flexibly positioned for each system configuration needs thereby eliminating complex fiber shuffles. Also shown in FIGS. 3A-3C, are additional features of the duplex ferrule's 20a unique configuration. Features are specifically designed for the duplex-ferrule 20a to be installed in the duplex-modulo optical blindmate connectors 10, 50. FIG. 3C prominently shows a base notch 23, and a neck notch 24 that are configured to allow for the duplex ferrule 20a to be stably retained by a carrier plate (shown in FIGS. 4A-4C), thereby installing the duplex ferrule 20a into the duplex-modulo optical connector. The base notch 23 is illustrated as an indentation including a raised ridged portion, which is location on the edge of the flange 21, located closer to the ferrule's base 22. The neck notch 24 is illustrated as an indentation located on the neck of flange 21 of the duplex ferrule 20a. The base notch 23 and neck notch 24 are generally concaved in shape to facilitate inserting a thin extended portion, or leaf, of the duplex ferrule carrier plate. Referring back to FIG. 1C, the duplex ferrule 20b can be slid into the carrier plate 30b, where spring leaves 33b, 34b are inserted into the indentation of the base notch 23 and neck notch 24, respectively. Thus, the duplex ferrule 20b installed in the carrier plate 30b is retained, and stabilized into physical position by the insertion of the extended portion of the spring leaves 33b, 34b into the open portions of the notches 23b, 24b. As a general description, the spring leaves 33b, 34b are positioned on the carrier plate 30b to correspond to the location of the notches 23b, 24b, respectively on the base and neck of the duplex ferrule 20b. The carrier plate 30b and spring leaves 33b, 34b are described in greater detail in reference to FIGS. 4A-4C.

Again, referring back to FIG. 1A, the receptacle is attached to a system mounting plate 16a, which can be a primarily flat panel having the blindmate receptacle connector housing 40 mounted thereto. Also seen in the perspective view of FIG. 1A, are the four duplex fibers 15a feeding into the back of the receptacle 10. In referring back to the previous example, the other end of the optical fibers 15a may be modularly attached to an optically co-packaged ASIC, and the optical fiber on plug 50 can be used to support an optical interconnection to a fiber port on another ASIC.

The perspective view in FIG. 1B is at an angle showing that the back of the receptacle (e.g., outward facing surface of the system mounting plate 16a surface, with respect to the blindmating surface) has a duplex ferrule carrier plate 30a installed thereto. The duplex ferrule carrier plate 30a can be configured to receive duplex ferrules 20a, as described above in reference to duplex ferrule carrier plate 30b. Thus, duplex ferrule carrier plate 30a securely retains the duplex ferrule 20a that is installed in the receptacle. According to the embodiments, installation of the duplex ferrule 20a within the duplex ferrule carrier plate 30a provides a spring floating (e.g., flexible movement) of the duplex ferrule 20a, and further allowing a spring deflection during blindmating.

Figure 4A:
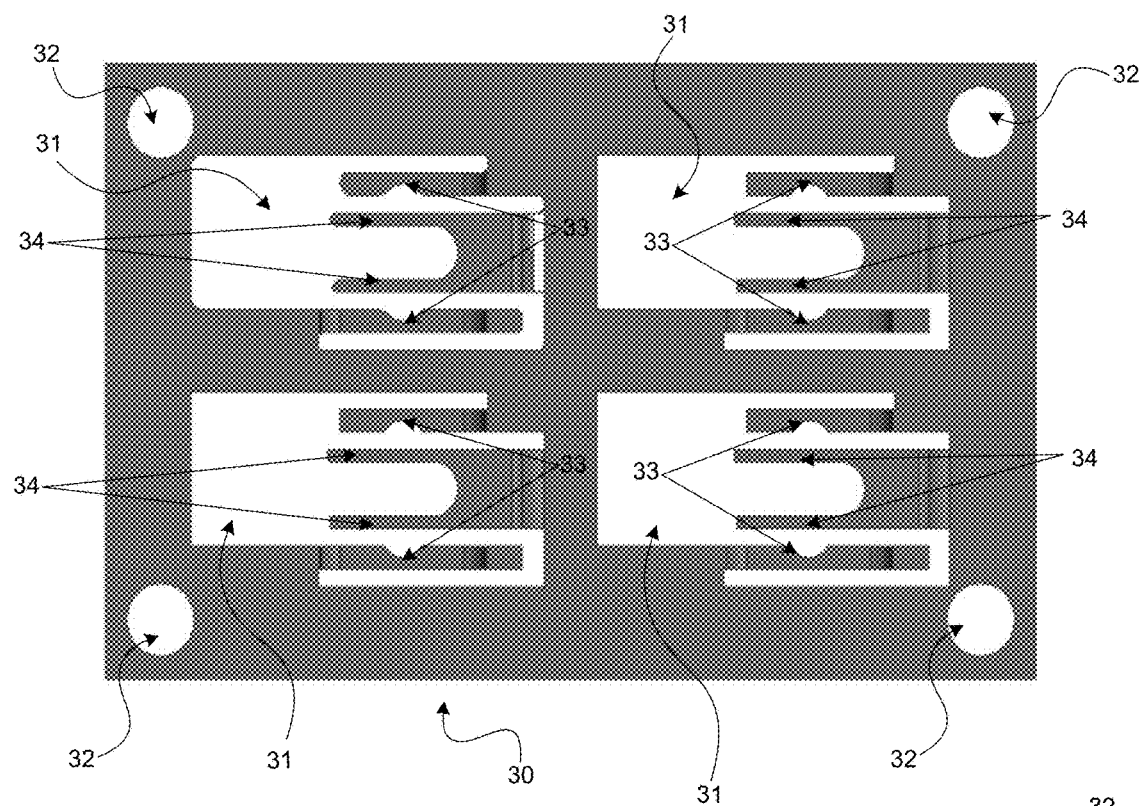
FIGS. 4A-4C are multiple perspective views of an example carrier plate configured for holding the duplex ferrules shown in FIGS. 3A-3C, according to some embodiments.
Figures 4B, 4C:
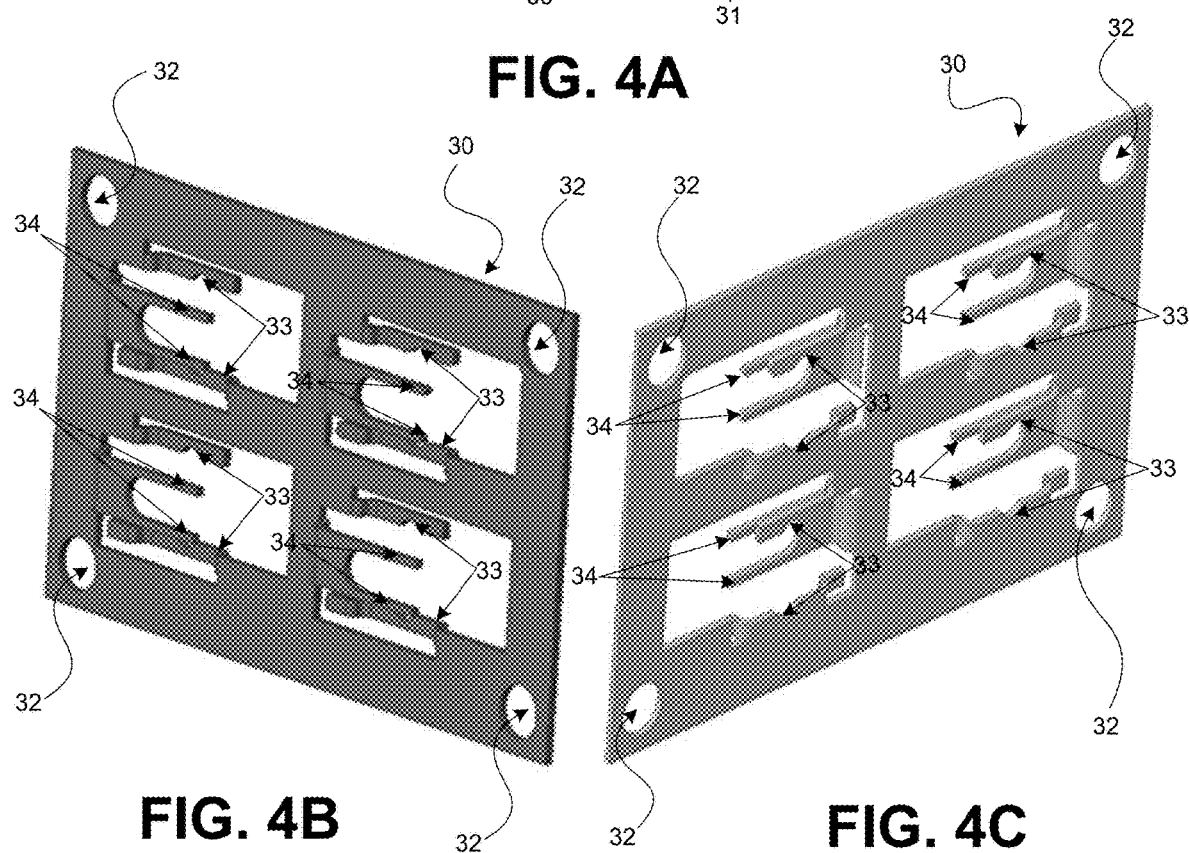

Also, the perspective view in FIG. 1A is at an angle showing that the back of the plug (e.g., outward facing surface of the mounting plate 16b surface, with respect to the blindmating surface) has a duplex ferrule carrier plate 30b attached thereto. The duplex ferrule carrier plate 30b is configured to receive and securely retain the duplex ferrule 20b, as alluded to above, in order to be installed in the plug. In the illustrated example, the duplex ferrule carrier plate 30b is mounted to the back of the mounting plate 16b by mounting screws 17. In reference to FIG. 1B, the plug is shown at an alternate angle, displaying a blindmate plug connector housing that is situated at the front (e.g., blindmating surface) of the system mounting plate 16b. Although not clearly illustrated in FIG. 1B, the plug connector housing 51 protrudes through an opening in the system mounting plate 16b, to reach the front. A similar configuration is discussed in greater detail, but regarding the receptacle, in reference to FIG. 2. Moreover, FIGS. 1A-1D show both the carrier plate 30b for the plug and the carrier plate for the receptacle have similar configurations. FIGS. 4A-4C illustrate multiple perspective views, which prominently show the configuration of the carrier plate 30a in greater detail.

FIG. 4A shows a forward-facing view of the carrier plate 30a that is configured for holding the duplex ferrule 20a. FIG. 4B illustrates a perspective view of the duplex ferrule carrier plate 30a at a first angle displaying its font surface (e.g., non-contacting surface with respect to mounting to the blindmate receptacle connector housing). FIG. 4C shows another perspective view of the duplex ferrule carrier plate 30a at a different angle, which displays its rear surface (e.g., contacting surface with respect to mounting to the blindmate receptacle connector housing). In the illustrated example, the duplex ferrule carrier plate 30a can be generally described as a plate, or thin panel. The duplex ferrule carrier plate 30a can be constructed as one-piece, but having a configuration (e.g., entry holes and extended members) that facilitate receiving, and retaining the duplex ferrule 20a. Additionally, the duplex ferrule carrier plate 30a can be constructed from a substantially lightweight and durable material, such as copper, carbon nanotube, metal or plastic. Thus, the duplex-modulo optical blindmate connector described herein can have an increased reliability, which can be associated with the minimum number of moving components and low-cost of having minimum components to be assembled.

Referring now to FIG. 4A, the duplex ferrule carrier plate 30a is shown as having multiple duplex ferrule entry holes 31. In the illustrated example, the duplex ferrule carrier plate 30a has a four-duplex ferrule configuration (e.g., holding four individual duplex ferrules), and thus includes four duplex ferrule carrier plate entry holes 31. A duplex ferrule entry hole 31 can be a slot, or opening, in the duplex ferrule carrier plate 30a allowing a duplex ferrule to be received.

Figure 5A:
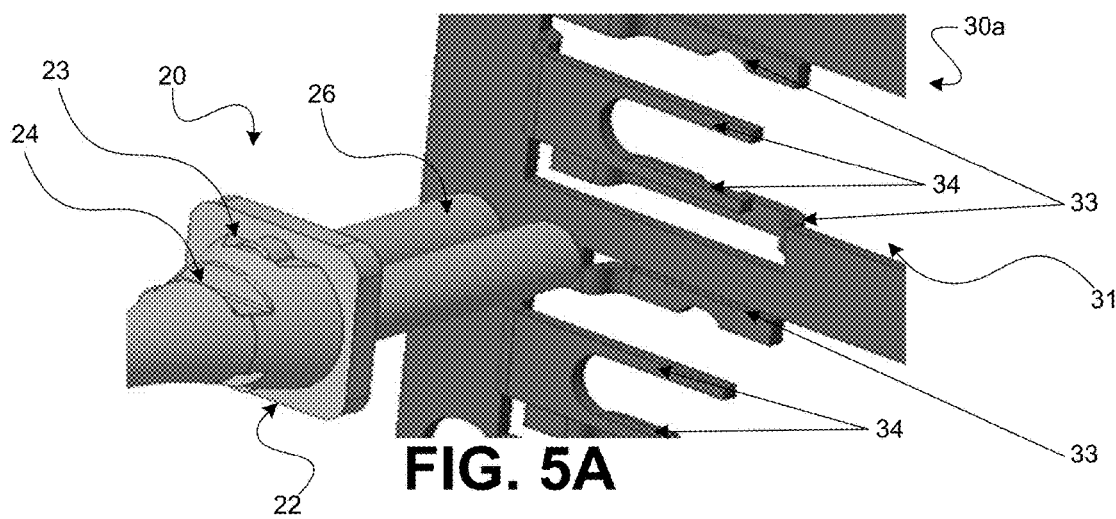
FIGS. 5A-5C are multiple perspective views of an example installation of the duplex ferrules in the carrier plate shown in FIGS. 4A-4C, according to some embodiments.
Figure 5B:
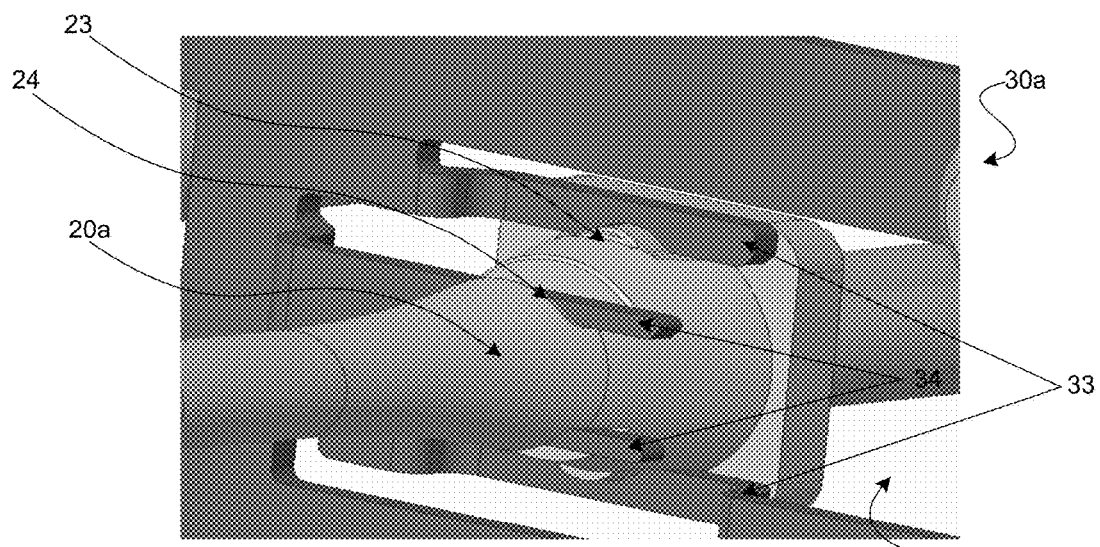

As an example, FIG. 5A illustrates a duplex ferrule 20a positioned to be placed through the duplex ferrule entry hole 31. As previously discussed, the duplex ferrule 20a can be slidably inserted into the carrier plate entry hole 31. Thereafter, as seen in FIG. 5B, the duplex ferrule 20a has fully entered the carrier plate entry hole 31, such that the duplex ferrule 20a is positioned on an opposing end of the carrier plate entry hole 31, hereinafter referred to as the attaching side of the hole 31. The attaching side includes the elements of the duplex ferrule carrier plate 30a, which support holding the duplex ferrule 20a therein. FIG. 5B shows that these elements can include the extended portions, or spring leaves 33, 34, of the duplex ferrule carrier plate 30a. As seen in FIG. 5B (after the duplex ferrule 20a is fully received by the duplex ferrule entry hole 31), the spring leaves 33, 34 of the duplex ferrule carrier plate 30a are aligned with the notched portions of the duplex ferrule 20a in manner that assists in stably coupling them together. As alluded to above, the arrangement of the duplex ferrule 20a within the duplex ferrule carrier plate 30a allows for the ferrule to be retained in a stable, yet flexible, manner.

Figure 5C:
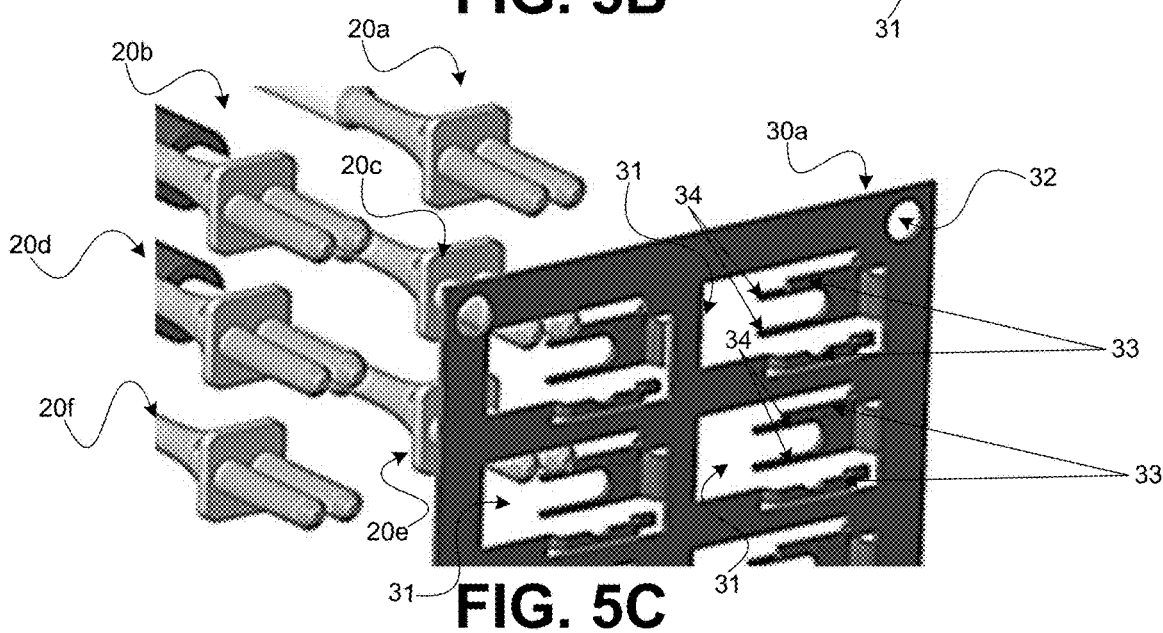

Referring back to FIG. 4A, each of the duplex ferrule entry holes 31 have, on the attaching side, the elements that facilitate retaining their respectively received duplex ferrules 20a. In detail, each duplex ferrule entry hole 31 includes neck spring leaves 34 and base spring leaves 33 at the attaching side of the hole 31. FIG. 5C illustrates an example of four duplex ferrules 20a, 20b, 20c, 20d. Each duplex ferrule 20a, 20b, 20c, 20d is being received by a respective duplex ferrule entry hole 31 of the duplex ferrule carrier plate 30a.

Now, referring again to FIG. 4A, base spring leaves 33 can be a two-pronged, and elongated portions of the duplex ferrule carrier plate 30a, which extend into (e.g., approximately the center) the duplex ferrule entry hole 31. The neck spring leaves 34 have a structure similar to that described for the base spring leaves 33. However, the neck spring leaves 34 have a portion that is concaved, or u-shaped, for receiving the ridged portion of the neck notch 24. Also shown in FIG. 4A, the base spring leaves 33 are positioned to be inserted into the base notches of the duplex ferrule. Additionally, the base spring leaves 33 are shown as more widely separated, having a larger distance between each leaf, than the neck spring leaves 34, due to the wider dimensions of the base of the duplex ferrule (in relation to the neck of the duplex ferrule). In the illustrated example, the neck spring leaves 34 are in an area between the base spring leaves 33. The perspective views in FIG. 4B and FIG. 4C show that the neck spring leaves 34 and the base spring leaves 33 are on separate planes (referring to a vertical plane with respect to the surface of the duplex ferrule carrier plate 30) forming two two-levels. Also, it can be seen in FIG. 5B that the base spring leaves 33 sit within the base notches 23 at a point that is further forward along the depth (e.g., z-axis) of the duplex ferrule 20a, then the point where the neck spring leaves 34 are in the neck notches 24. This two-level configuration of the spring leaves 33, 34, supports the duplex ferrule 20a at different depth points, providing greater stability during the blindmating. Additionally, it should be noted that FIG. 5B illustrates that the duplex ferrule 20a includes base notches 23, and neck notches 24 on both sides (e.g., top and bottom) across the length (e.g. y-axis) of the ferrule.

The term "spring" can generally describe characteristics of the leaves 33, 34, including: exerting tension to stabilize the duplex ferrules into a physical position; and absorbing some force from movement of the duplex ferrules. Moreover, "spring" is a characteristic of the leaves 33, 34 which support the spring floating of the duplex ferrules, allowing three-dimensional movement of the ferrules (e.g., x-direction, y-direction, and z-direction with respect to the surface of the duplex ferrule carrier plate 30). Many existing blindmate connectors allow for such floating movement of the ferrules by using multiple components including coil springs and allowing many-fiber ferrule to be freely moved within a connector housing, that translate to physically larger and more expensive connectors. Even further, the spring leaves 33, 34 provide deflection during a blindmating operation. For example, FIGS. 11A-11E illustrate a blindmating of the duplex-modulo optical blindmate connectors, where spring deflection may occur.

Now referring to FIGS. 11A-11E, a side view of a blindmating sequence for the duplex-modulo optical bind mate connector, similar to the blindmating in FIGS. 1A-1D, is shown. In FIG. 11A, the receptacle 10 and the plug 50 are completely separated. In FIG. 11B, there is physical contact between the housings of the receptacle 10 and the plug 50 at their respective interfacing surfaces. However, it can be seen that the duplex ferrules 20a, 20b installed therein are not fully mated. Thus, additional force can be applied, so that the single-fiber ferrules 26b of the plug 50, for instance, can move towards being fully pushed against a like ferrule 26a in the receptacle 10, as illustrated in FIGS. 11B-11C. The plug 50 may be stationary in FIGS. 11A-11C.

Additionally, FIGS. 11A-11E illustrate an example of mating a housing alignment feature (pin) 55 of the plug 50, and a housing alignment feature (hole) 41 of the receptacle 10. As seen in FIG. 11B, the housing alignment features 41, 55 can be aligned such that the pin, namely housing alignment feature 55, can be inserted inside of the housing alignment feature 41, as the plug 50 and receptacle 10 move towards each other in the mating sequence. In detail, FIG. 11B shows that the tip of housing alignment feature 55 can be placed directly underneath the hole's opening of housing alignment feature 41, thereby initially aligning the housing alignment features 41, 55. By aligning the housing alignment features 41, 55, the plug 50 and receptacle 10 are also aligned for properly blindmating the duplex ferrules 20a installed within receptacle 10 with the complimentary duplex ferrules 20b installed in plug 50. Further in the mating sequence, FIG. 11C shows the pin of housing alignment feature 55 partially inserted inside of the interiorly conical structure of housing alignment feature 41. As the receptacle 10 and plug 50 are fully seated, in FIG. 11E for example, the pin of housing alignment feature 55 is fully inserted inside of the housing alignment feature 41. Also shown, are two lateral edges 57 extended from opposing sides of plug 50 that can be received by the recessed edges along the housing body of receptacle 10 during blindmating. The edges 57 form a generally U-shaped structure, which allows the plug 50 to accept and stably seat the housing body of receptacle 10 in the space between its raised edges 57.

In FIGS. 11D-11E, the receptacle 10 and the plug 50 are fully seated. For example, the dashed line 1101a placed at the center (approximately) of the housing for receptacle 10, and the dashed line 1102a placed at the center (approximately) of the housing for plug 50 in FIG. 11D illustrates the placement of the connectors 10, 50 prior to being stably coupled (e.g., connector face surfaces fully resting against each other), referred to in this example as "bottoming out." The dashed lines 1101b, 1102b in FIG. 11E are placed at the center of the housings for connectors 10, 50, respectively, in their arrangement after the connector housings are bottomed out. The movement of the housings for the connectors 10, 50 is illustrated, by comparing the positions of the dashed lines 1101a, 1102a in FIG. 11D to the corresponding dashed lines 1101b, 1102b in FIG. 11E. In detail, the position of the dashed line 1102a corresponding to plug 50 in FIG. 11D is lower in comparison to the dashed line 1102b in FIG. 11E, which is elevated to a higher vertical position (i.e., plug 50 moving slightly up) along the y-axis. In contrast, the position of the dashed line 1101b corresponding to the receptacle 10 is lower in FIG. 11E (e.g., receptacle 10 moving slightly down) as compared to the dashed line 1101a in FIG. 11D. Thus, there is less space between the dashed lines 1101b, 1102b in FIG. 11E than dashed lined 1101a,1102a in FIG. 11D, serving to illustrate that the housings of the connectors 10, 50 moved closer together from the force applied during blindmating and after bottomed out.

In this scenario, the spring leaves (shown in FIG. 4A) can cause deflection, which in turn can provide positive reactive force when a ferrule is fully pushed against its complimentary ferrule. A comparison of FIG. 11D to FIG. 11E illustrates that the spring leaves of carrier plate 30a of the receptacle 10 have been deflected, as seen by a displacement of the spring leaves farther up in the (+) y-direction (with respect to the mating surface of the housings). This displacement is also illustrated by the neck spring leaves 34a in FIG. 11D being under the dashed line 1103b that is (approximately) the position of the deflected neck spring leaves 34a in FIG. 11E. The dashed line 1103a is (approximately) the position of the body of carrier plate 30a of the stationary receptacle 10 in FIG. 11D and FIG. 11E. Additionally, the duplex ferrules of the plug 50 in FIG. 11E are farther down in the (−) y-direction (with respect to the mating surface of the housings) than their position in FIG. 11D, which can be a result of the reactive force of the spring leaves during blindmating. It should be appreciated that spring deflection can be on the side of the receptacle 10, the side of the plug 50, or on both sides. In some embodiments, the spring deflection is based on characteristics including, but not limited to: manufacturing tolerances in dimensions of the ferrule base; manufacturing tolerances in dimensions of the ferrule carrier plate; manufacturing tolerances in dimensions of the connector housing; manufacturing tolerances in dimensions of the connector housing; manufacturing tolerances in dimensions of the mounting plate; and the ferrule carrier plate material.

Referring back to the blindmating in FIG. 1A, the receptacle 10 can include a blindmate receptacle connector housing 40. Similarly, the plug 50 can include a blindmate plug connector housing 51 in FIG. 1B. The blindmate receptacle connector housing 40 can be generally described as having female portions, which are interiorly conical and structured to receive the extended portions of the blindmate plug connector housing 51, in order to stably join the two connectors together during blindmating. The receptacle 10 and plug 50 are considered fully seated, when there is full contact between the front surfaces of their respective housings 40, 51. FIG. 11E shows the blindmate receptacle connector housing 40 and the blindmate plug connector housing 51 in a fully seated condition.

In reference to FIG. 1A and FIG. 1B, the blindmate receptacle connector housing 40 can be generally described as a block having multiple surfaces, including: a rear face 46 (e.g., carrier plate attachment side which is away from the blindmating surface); a front face 47 (e.g., blindmating surface); and sides or lateral edges, comprising its perimeter. In some cases, the blindmate receptacle connector housing 40 can be constructed of a material, such as plastic, serving as a rigid exterior for the receptacle 10. Accordingly, the blindmate receptacle connector housing 40 holds multiple duplex modulo ferrules installed therein, while also providing alignment lead-in features 41, referred to herein as holes, and recessed edges of the blindmate receptacle connector housing 40, as alluded to above. These alignment features of the blindmate receptacle connector housing 40 can allow for the corresponding plug-side ferrules to be mated and a provide a stable contact surface for the receptacle 10 during blindmating. As seen in FIG. 11E, the blindmate receptacle connector housing 40 is an exterior surface for the receptacle 10, allowing the plug 50 to be forcibly pressed up against is front face during blindmating. Referring back to FIG. 1A, the blindmate receptacle connector housing 40 can also be affixed to the system mounting plate 16a, for further mounting receptacle to an associated system. Moreover, FIG. 1B shows that the duplex carrier plate 30a can be affixed to the rear face of the blindmate receptacle connector housing 40. FIGS. 6A-6D illustrate the blindmate receptacle connector housing 40 in greater detail.

Figure 6A:
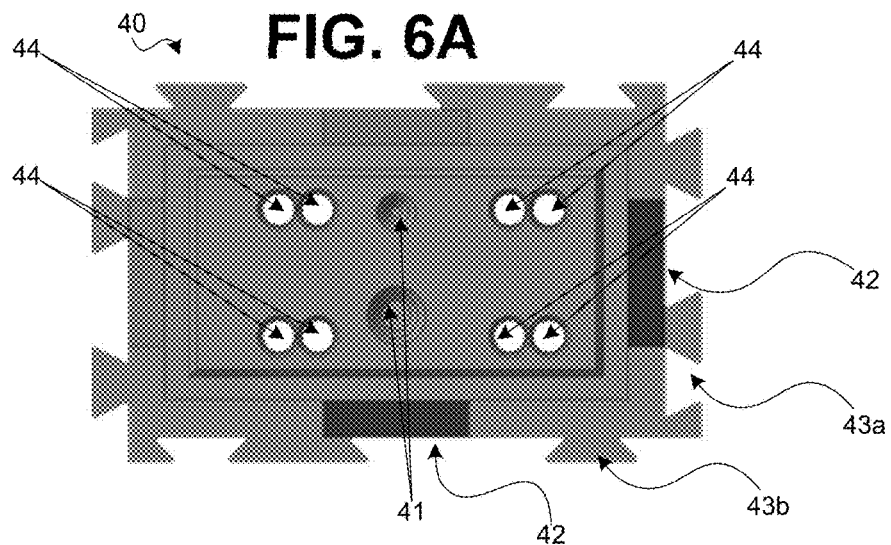
FIGS. 6A-6F are multiple views of an example housing for a duplex-modulo optical blindmate connector configured as the receptacle for the blindmating shown in FIGS. 1A-1D, according to some embodiments.

In the example of FIG. 6A, that the blindmate receptacle connector housing 40 includes multiple housing alignment features 41. The housing alignment features 41 can be structured as holes, or openings, along the front face of the blindmate receptacle connector housing 40 usable for proper alignment and mating of the blindmate receptacle connector housing 40 for coupling the blindmate plug connector housing (shown in FIG. 7A). The housing alignment features 41 can be generally described as female elements of the blindmate receptacle connector housing 40, being conically shaped to receive the complimentary extending portions (e.g., pins) 55 of the blindmate plug connector housing (shown in FIG. 7B) during alignment. As an example, the housing alignment features 41 are positioned on the blindmate receptacle connector housing 40 such that, once pins 55 extending from the blindmate plug connector housing are inserted into the holes 41, the housings are properly aligned (e.g., allowing the proper complimentary elements to interact to achieve optical coupling). FIG. 1C illustrates an example of the receptacle 10 and the plug 50 properly aligned during blindmating, where the duplex fibers 27b within single-fiber ferrules 26b installed in the plug 50 are arranged in a straight line with the corresponding duplex fibers 27a within single-fiber ferrules 26a installed in the receptacle. FIG. 1C is a cross-sectional view of FIG. 1D (indicated by the dashed lines). Accordingly, the housing alignment features 41 of the blindmate receptacle connector housing 40 assists in achieving proper single-fiber ferrule 26 alignment, to assist in improving performance of the duplex-modulo optical blindmate connectors over existing high-density connectors.

Figure 6B:
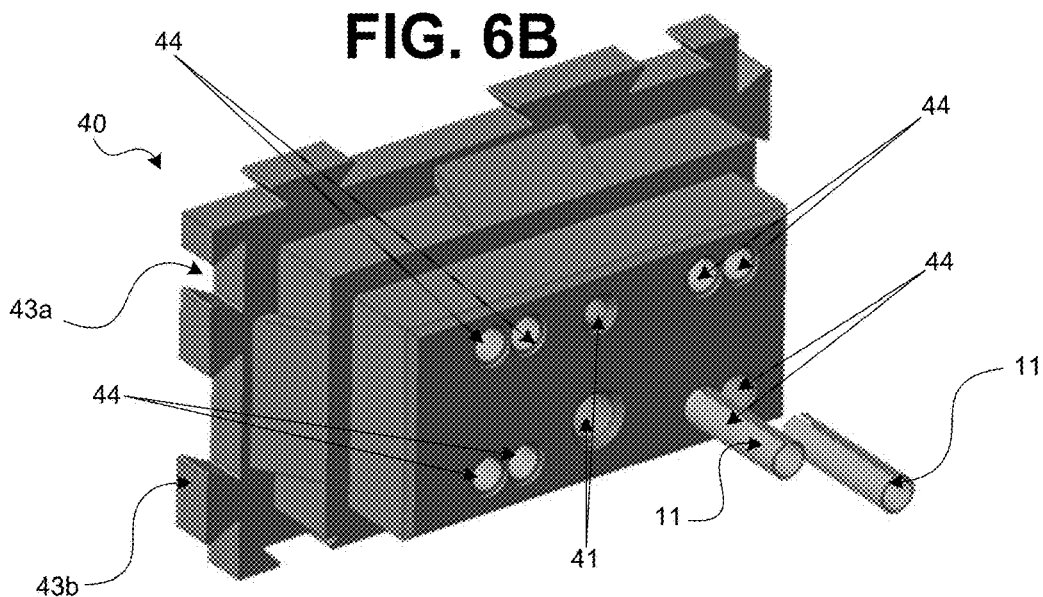

FIG. 6B illustrates that final alignment sleeves 11 may be inserted into bores 44 of the blindmate receptacle connector housing 40. For example, the tips of the single-fiber ferrules 26 may be surrounded by protective final alignment sleeves 11. Each final alignment sleeve 11 can be flexible tubing for aligning the complementary optical fibers 27a, 27b of the single-fiber ferrules 26a, 26b within a bore 44. The final alignment sleeve 11 may have tapered or chamfered lead-in ends (not shown) for duplex fiber ferrule to be inserted to prevent sleeve and/or ferrule damages. The final alignment sleeve 11 may also have a split surface along the depth (not shown) for the final alignment sleeve for tight tolerance fitting within a varying tolerance bore and to allow flexibly tight fitting when a duplex fiber ferrule of varying tolerances is inserted. Final alignment sleeves may be made of zirconia, ceramic or other material with minimum friction surface for the duplex fiber ferrules to be easily and tightly inserted. Bores 44 can generally be described as female portions of the blindmate receptacle housing 40, being internally conically shaped to receive the corresponding extended portions of the single-fiber ferrules 26 of the plug that can protrude through the blindmate plug connector housing (shown in FIG. 1C). The bore 44 can be a hole, or opening, creating a tunnel through the depth of the blindmate receptacle connector housing 40. Referring to FIG. 1C, the illustration prominently shows the final alignment sleeves 11 fully inserted into bores 44, and arranged to receive a complimentary single-fiber ferrules 26 installed at the plug 50. As an example, during blindmating, a single-fiber ferrule 26 extending from the plug 50 can be inserted into a corresponding bore 44, where it is guided by the final alignment sleeves 11 such that the optical fibers 27b (in the plug 50) are properly aligned for optically coupling to optical fibers 27a (in the receptacle 10). Accordingly, the final alignment sleeves 11 of the blindmate receptacle connector housing 40 achieves proper optical fiber core alignment, thereby improving performance of the duplex-modulo optical blindmate connectors over existing high-density connectors (e.g., further realizing the previously discussed principles of fiber connectivity).

Figure 6C:
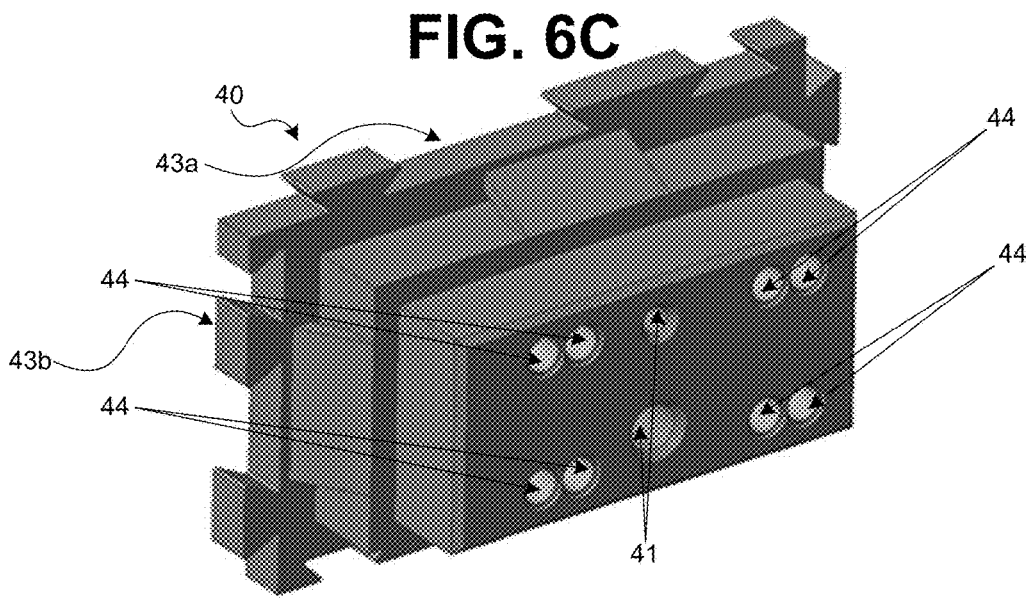
Figure 6D:
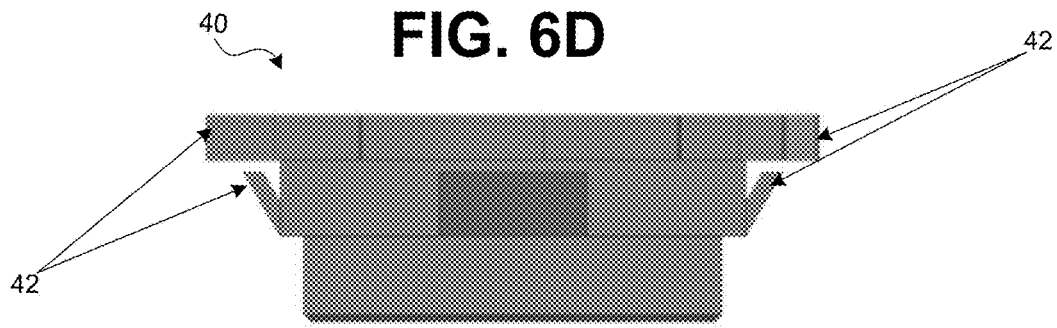
Figure 6E:
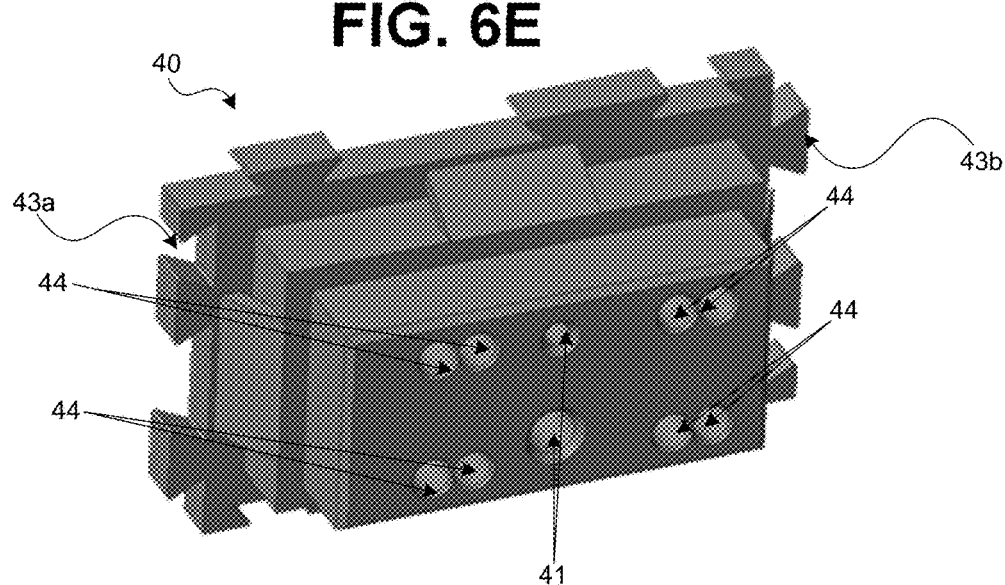
Figure 6F:
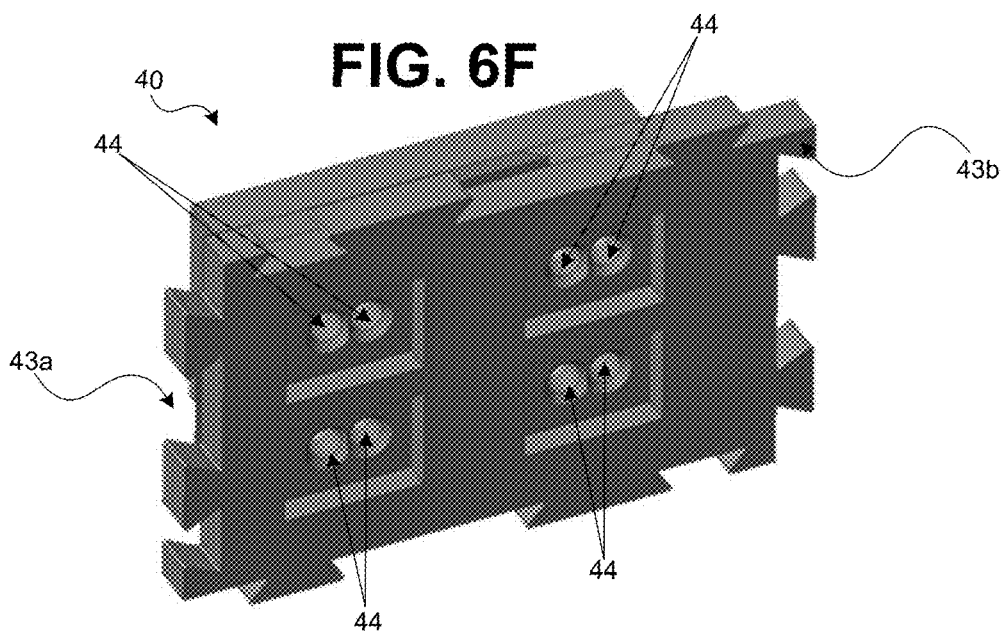
Figure 8:
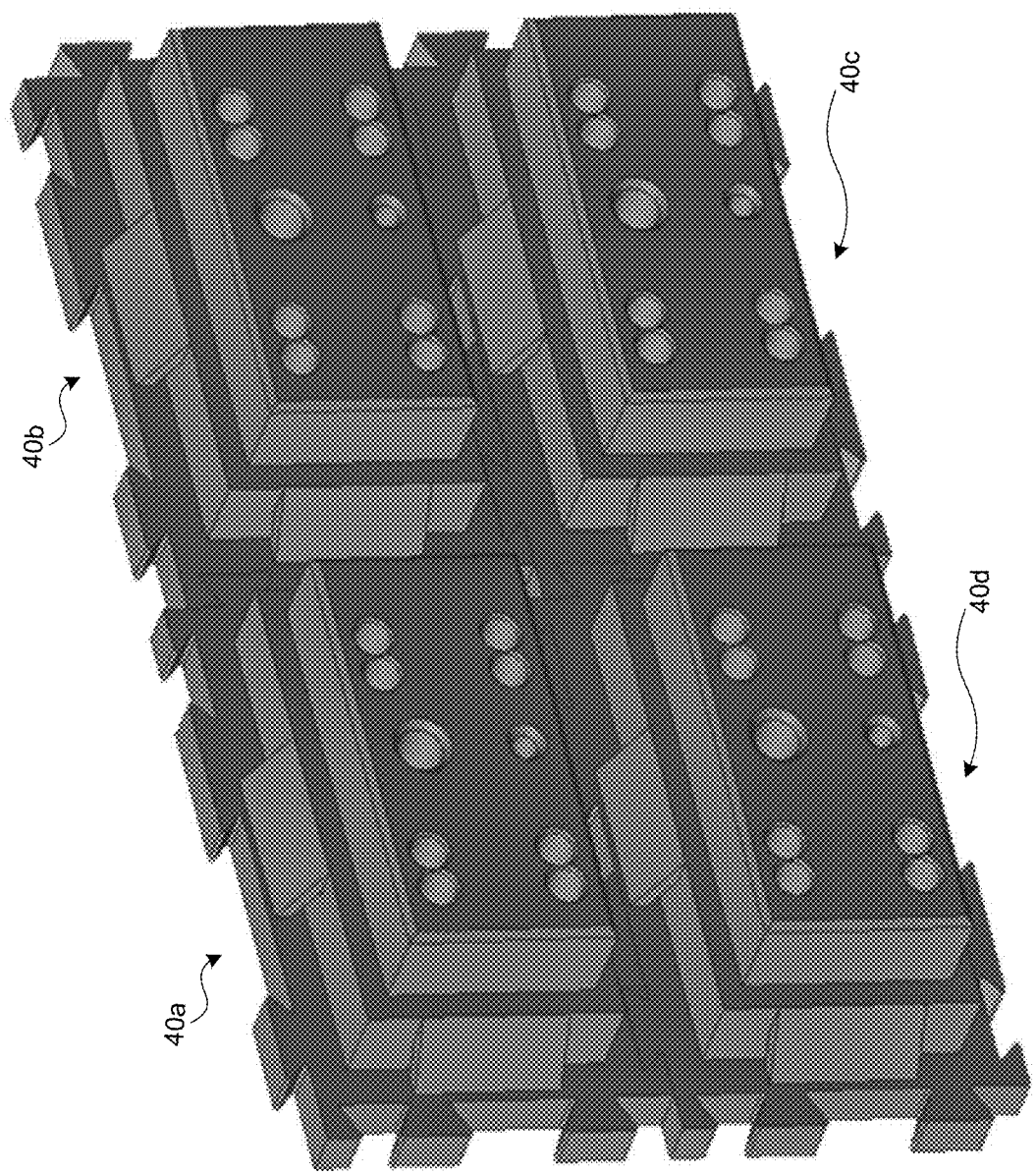
FIG. 8 is a perspective view of an example of cascaded housings for the duplex-modulo optical blindmate connectors configured as the receptacles shown in FIGS. 6A-6D, according to some embodiments.

FIG. 6C, FIG. 6E, and FIG. 6F are multiple perspective views of the blindmate receptacle connector housing 40 illustrating the cascading features 43a, 43b (referred to together herein as cascading features 43). As seen, the blindmate receptacle connector housing 40 can be constructed including cascading features 43a. 43b on each side of its perimeter. The cascading features 43a, 43b can couple like housings together on one or more sides, providing modularity and scalability to fabrics formed using the duplex-modulo optical blindmate connectors disclosed herein. In the illustrated example, the cascading features 43a, 43b can be structured to include alternating recessed portions 43a and protruding portions 43b along the sides of the blindmate receptacle connector housing 40. For instance, when cascading, a protruding portion 43b of the blindmate receptacle connector housings 40 can mate with a complimentary recessed portion of another receptacle housing for coupling the housings together. In continuing with the example, the recessed portion 43a of the blindmate receptacle connector housings 40 can mate with a complimentary protruding portion of another receptacle housing. Accordingly, multiple numbers of blindmate receptacle connector housing 40 can be cascaded. For purposes of illustration, FIG. 8 shows an example of blindmate receptacle connector housings 40a, 40b, 40c, 40d coupled together in accordance with the cascading features discussed above.

Now referring to FIG. 6D, a side view of the blindmate receptacle connector housing 40 shows the panel mounting features 42. The panel mounting features 42 are on opposing sides of the blindmate receptacle connector housing 40 allowing mounting to a system mounting plate. The panel mounting features 42 can be structured as a top protruding edge, and a bottom lip, creating a slot for the substantially linearly-shaped system mounting plate to slide through and be stably retained. For example, FIG. 1C illustrates the system mounting plate 16a inserted into the panel mounting features 42 of the blindmate receptacle connector housing 40, thereby mounting the blindmate receptacle connector housing 40 thereto.

Figure 2:
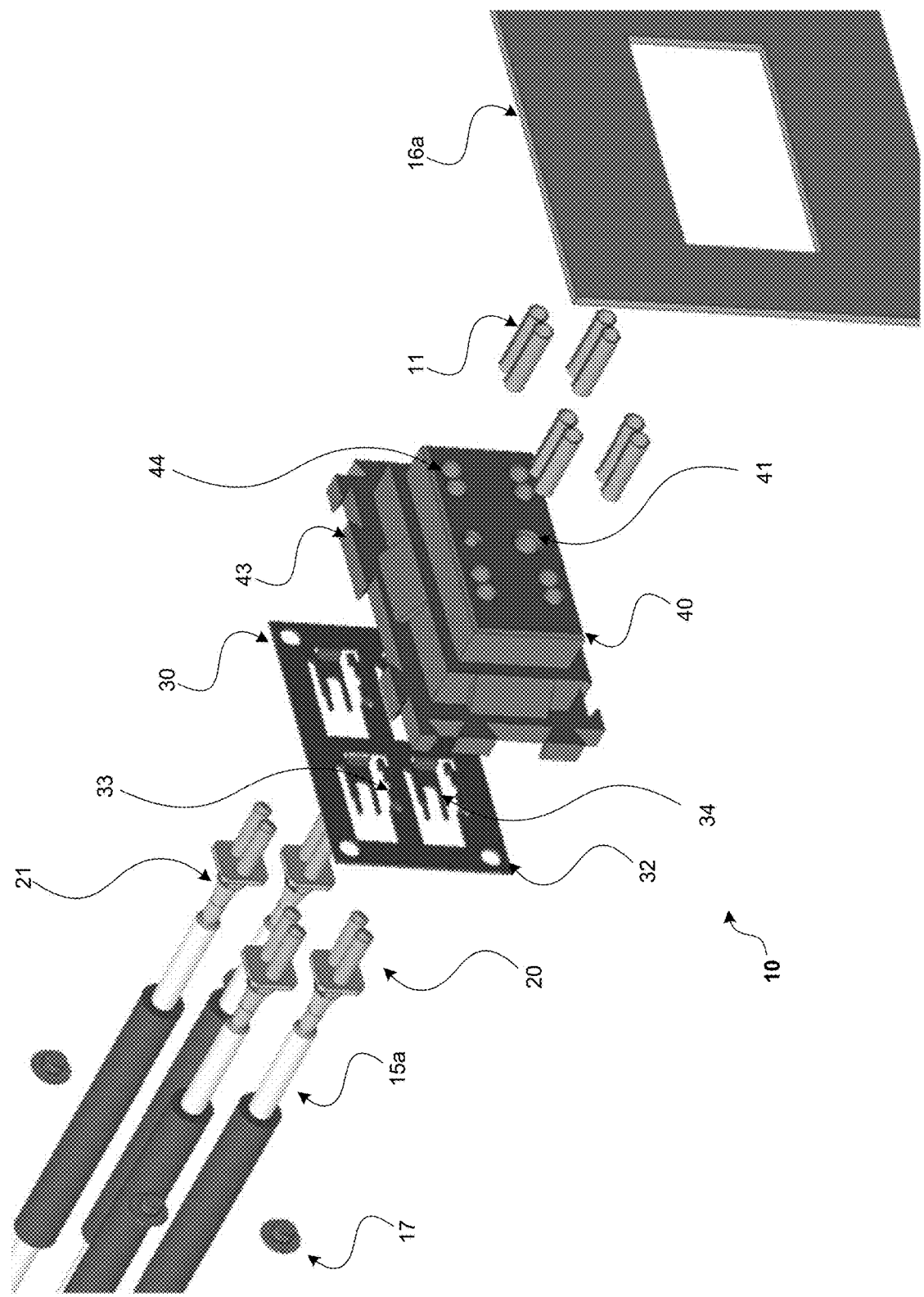
FIG. 2 is an exploded isometric view of an example duplex-modulo optical blindmate connector configured as a receptacle in the blindmating shown in FIGS. 1A-1D, according to some embodiments.

Referring now to FIG. 2, an exploded isometric view of the receptacle 10 is shown. The example illustrates the multiple layers of elements that assemble receptacle 10. For example, a first assembly layer can be described as installing the duplex fibers 15 into the carrier plate 30. A subsequent assembly layer can be affixing the carrier plate 30 to the blindmate receptacle connector housing 40 using mounting screws 17, for example. Next, can be inserting the final alignment sleeves 11 into the bores 44 of the blindmate receptacle connector housing 40. Lastly, the receptacle 10 may be considered fully assembled after mounting the blindmate receptacle connector housing 40 to the system mounting plate 16.

Referring back to FIG. 1B, the blindmate plug connector housing 51 is shown as a having generally male portions, that are structured as extended or elongated members to be received by the female portions of the blindmate receptacle connector housing 40 (shown in FIG. 1A), in order to stably join the two connectors together during blindmating. It is important to note that the blindmate plug connector housing 51 has a center portion of its front face that is recessed, or sets back from the edges of the housing 51. This generally recessed shape enables the blindmate plug connector housing 51 to fully accept the front face of the blindmate receptacle connector housing 40 that has a portion that extends outward during blindmating. Thus, the physical coupling can be improved during fully seating the housings 40, 51 (e.g., during blindmating), which allows the duplex-modulo optical blindmate connectors to further realize the principles of optical connectivity, as alluded to above. Moreover, the housings 40, 51 can be generally described as compact, and modularly accepting varying numbers of independent duplex ferrules allowing scalability of the fiber shuffles formed.

Figure 9:
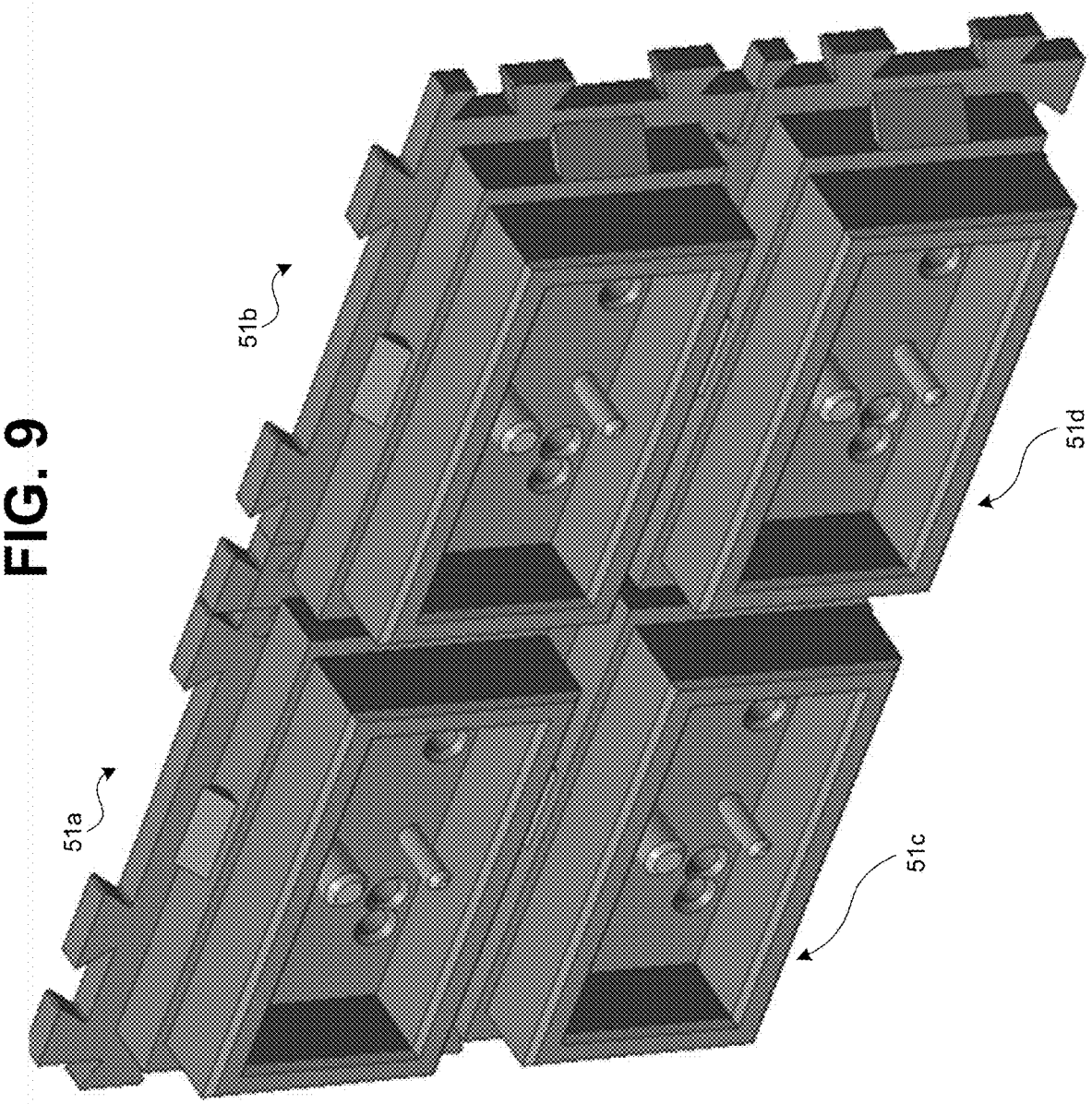
FIG. 9 is a perspective view of an example of cascaded housings for the duplex-modulo optical blindmate connectors configured as the plugs shown in FIGS. 7A-7D, according to some embodiments.

FIG. 7A-7D show the blindmate plug connector housing 51 in greater detail. For purposes of brevity, elements of the blindmate plug connector housing 51 that are similarly components of the blindmate receptacle connector housing 40 (shown in FIGS. 6A-6F) are not discussed in detail again in reference to FIGS. 7A-7D. For instance, bores 54 (shown in FIG. 7A), panel mounting features 52 (shown in FIG. 7C), and cascading features 53 (e.g., identified individually as cascading features 53a and 53b, respectively, shown in FIG. 7D) present on the blindmate plug receptacle housing 51 have the same general structure and function of bores 44 and cascading features 43 (e.g., cascading features 43a and 43b) as described above in reference to the blindmate receptacle connector housing 40. However, in referring to FIG. 1C, it should be appreciated that bores 54 of the blindmate plug connector housing 51 allow for single-fiber ferrules 26 of duplex ferrules 20b to protrude though, acting as male portions of the plug 50 to be accepted by the receptacle 10 during blindmating. For purposes of illustration, FIG. 9 shows an example of blindmate plug connector housings 51a, 51b, 51c, 51d coupled together in accordance with the cascading features discussed above. Thus, it should be understood that the cascading features allows for the duplex-modulo optical blindmate connectors to also achieve a high fiber count, in manner similar to high-density connector, by minimizing the connector housing mounting feature overheads combined with small dimensional features of the ferrules.

FIG. 7B illustrates that the housing alignment features 55 of the blindmate plug connector housing 51 can be pins that are structured as male portions of the housing 51. The housing alignment features 55 can be pins that are circularly shaped, similar to the internal geometry of the blindmate receptacle connector housing's 40 complimentary alignment features (shown in FIG. 6A). During blindmating, the housing alignment features 55 can be inserted into the alignment features of the blindmate receptacle connector housings 40 to ensure that the housings 40, 51 are properly aligned as previously described above. There may be more than one housing alignment features 55 that may have different diameters to "key" the blindmate plug connector housing 51 to be mated to a blindmate receptacle connector housing 40 with a correct orientation. Additionally, FIG. 7A illustrates a cascading stop feature 56.

Figure 10A:
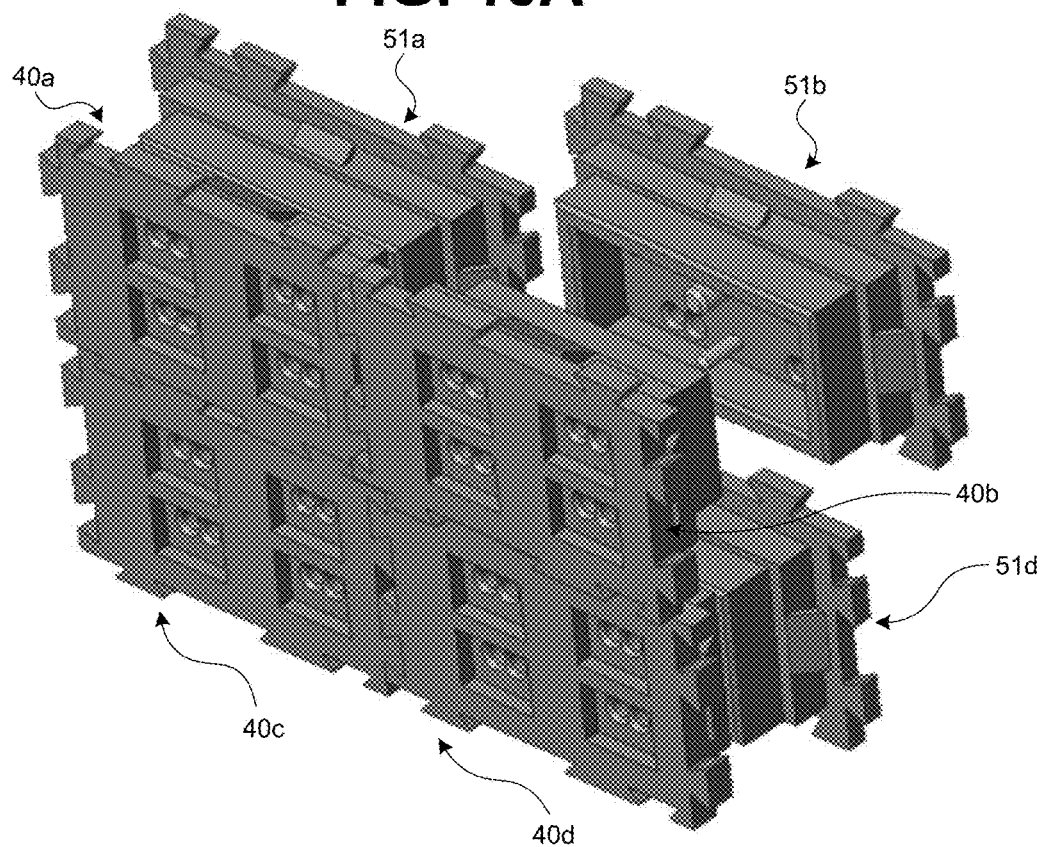
FIGS. 10A-10B are perspective views of an example of mating the cascaded housings for the duplex-modulo connectors configured as receptacles shown in FIG. 8 and the cascaded housings for the duplex-modulo connectors configured as plugs shown in FIG. 9, according to some embodiments.
Figure 10B:
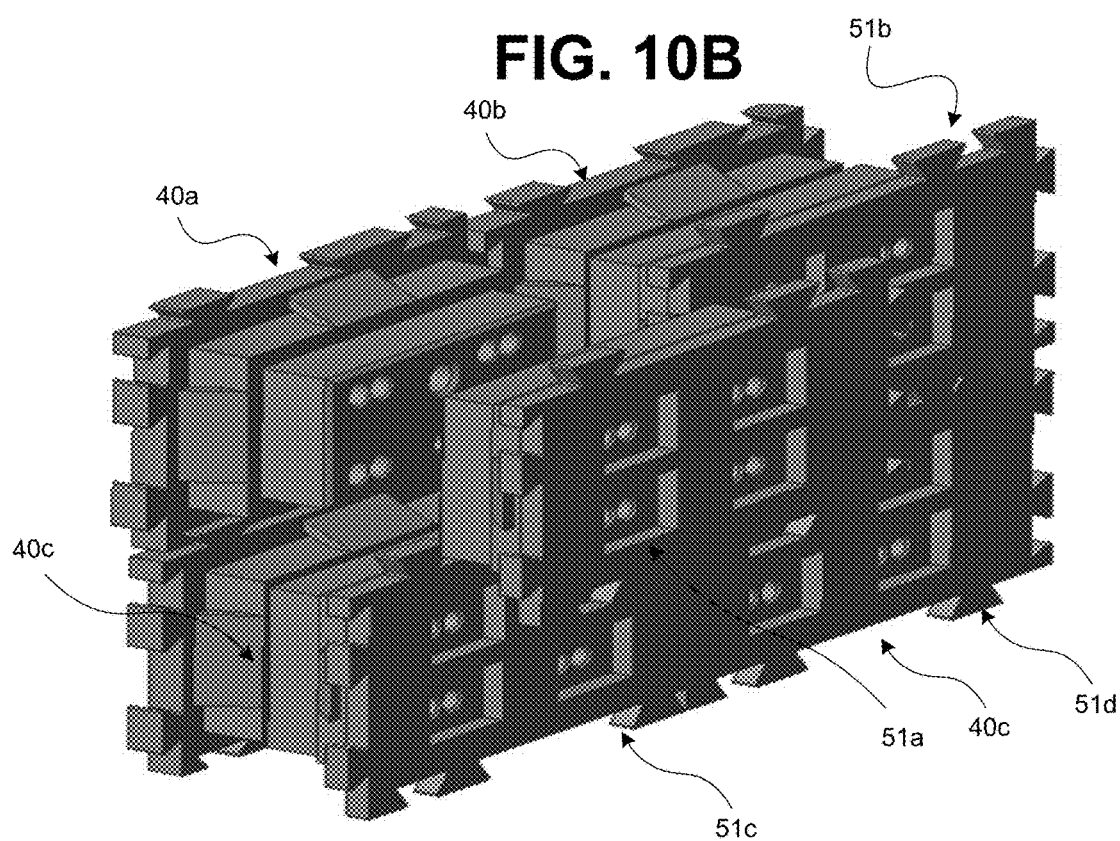

Even further, FIGS. 10A-10B illustrates an example of cascaded blindmate plug connector housings 51a, 51b, 51c, 51d mated with cascaded blindmate receptacle connector housings 40a, 40b, 40c, 40d showing the modularity and scalability that can be achieved in accordance with the cascading features. Thus, the duplex-modulo optical blindmate connectors disclosed herein can realize improvements over existing optical blindmate connector, which can be problematic in systems with complex fiber connection topologies among multiple embedded optical ferrules. Due to the rigidness and lack of fine scalability in existing optical blindmate connectors, expensive and complex fiber shuffles may be required. In contrast, an example fiber shuffle using the duplex-modulo optical blindmate connectors disclosed herein, is shown in FIG. 12.

Figure 12:
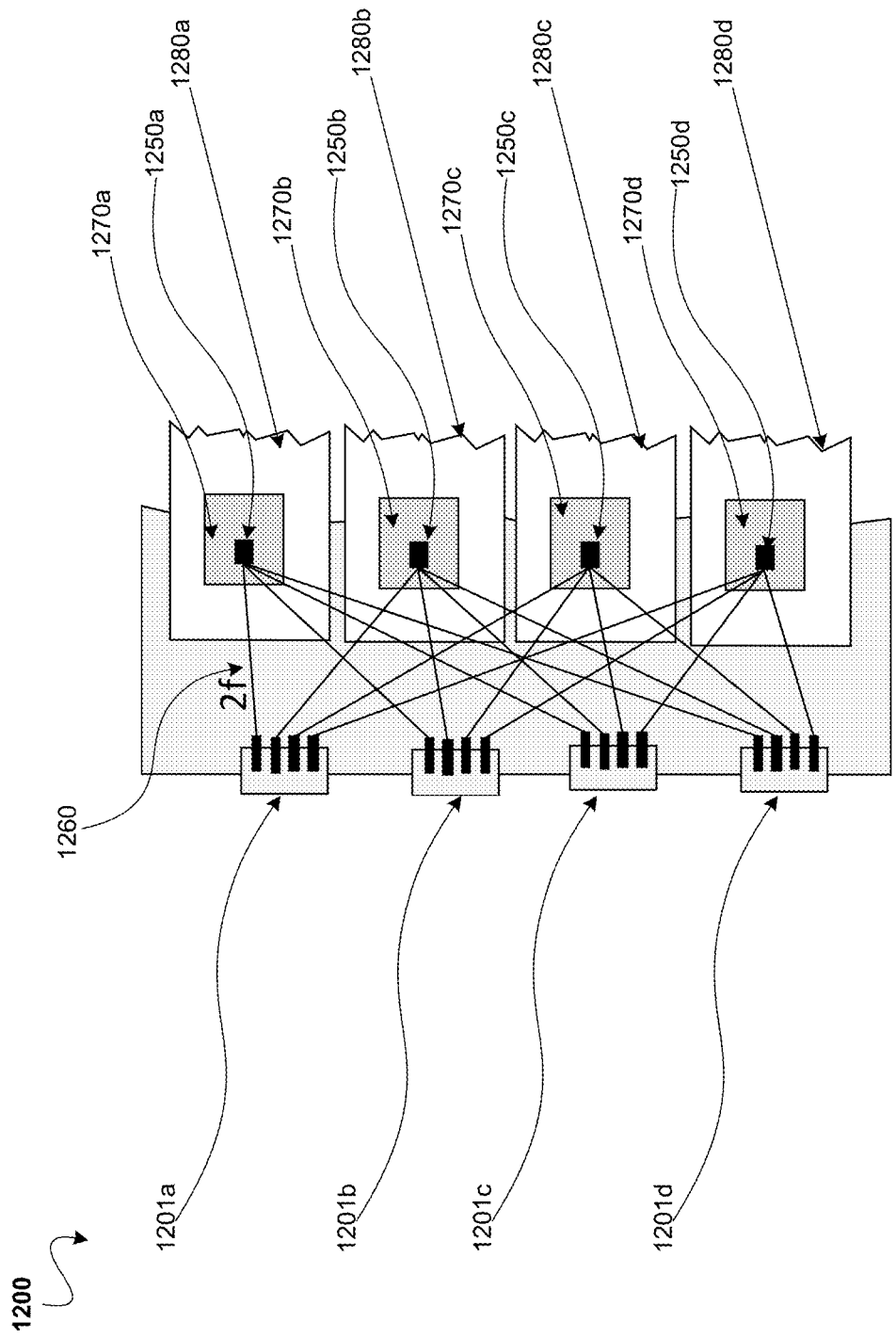
FIG. 12 is a conceptual diagram of an example fiber shuffle from mating multiple duplex-modulo optical blindmate connectors, according to some embodiments.

FIG. 12 illustrates a block diagram of a system 1200 consisting of switch ASICs 1270a, 1270b, 1270c, 1270d coupling to duplex-modulo optical blindmate connectors 1201a, 1201b, 1201c, 1201d having independently mating duplex ferrules. The switch ASICs 1270a, 1270b, 1270c, 1270d may be on switch modules 1280a, 1280b, 1280c, 1280d, respectively. There may be additional optical connectors between the optical blindmate connectors 1201 and chip ferrules 1250 (identified individually as chip ferrules 1250a, 1250b, 1250c, and 1250d as illustrated in FIG. 12) which are not illustrated in FIG. 12. In some cases, the duplex ferrules of the optical blindmate connectors 1201a, 1201b, 1201c, 1201d, are coupled to chip ferrules 1250a, 1250b, 1250c, 1250d of the corresponding switch ASICs 1270a, 1270b, 1270c, 1270d by optical fiber fan-out jumpers 1260. Each chip ferrule may support four pairs of fibers. A fiber of each fiber pair may support transmit optical signals and another fiber may support receive optical signals. Optical signals may comprise multiple wavelengths. Each optical fiber fan-out jumper 1260 is a simple fiber assembly comprising a fiber pair from a chip ferrule 1250 coupled to each of the four duplex ferrules. The duplex ferrules of each optical fiber fan-out jumper 1260 are installed in the duplex-modulo optical blindmate connectors 1201 in an interleaved configuration. In some cases, the four duplex ferrules fan-out from the chip ferrule 1250a are installed in the duplex-modulo optical blindmate connectors 1201a, 1201b, 1201c, 1201d; the next four duplex ferrules fan-out from the chip ferrule 1250b are installed adjacently in the duplex-modulo optical blindmate connectors 1201a, 1201b, 1201c, 1201d; and so on. The use of fan-out jumper cables 1260 provides increased flexibility (since different fiber lengths may be needed between each chip ferrule and the four duplex ferrules within a system 1200), and significantly reduces the complexity of the fiber shuffle. The system 1200 may be a switch enclosure. As alluded to above, the duplex-modulo optical blindmate connectors allow optical fibers from ASICs to be coupled to blindmate (or faceplate) connectors using duplex ferrules. Accordingly, the techniques described herein provide a flexibility with the use of the duplex-modulo optical blindmate connector that allows specific requirements for a particular system configuration to be met. Thus, systems can be reconfigured, without requiring new and different fiber shuffle designs. In addition, system reconfigurations can be achieved with potentially fewer connection stages since each chip ferrule can have different fiber lengths to varying distance duplex ferrules, thereby eliminating connection stages to translate different fiber lengths. In cases using existing high-density connectors, as previously discussed, the lack of modularity necessitates multiple and complex fiber shuffles for different configurations, which can cause long lead times in supplying the fiber shuffle assemblies by vendors. In contrast, utilizing the disclosed duplex-modulo optical blindmate connectors can result in lower costs fiber assemblies (e.g., without requiring fixed fiber shuffles), faster time-to-market, and lower optical power loss (e.g., due to single-fiber ferrule mating within each duplex-modulo connector, and fewer fiber connection stages within a system).

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A duplex-modulo connector, comprising:
    a carrier plate receiving a duplex ferrule, comprising:
        an entry slot receiving the duplex ferrule;
        neck spring leaves receiving first notches situated on a neck portion of the duplex ferrule and exerting tension or compression to support stabilizing the duplex ferrule and absorbing movement to support spring floating of the duplex ferrule; and
        base spring leaves receiving second notches situated on a base portion of the duplex ferrule, and exerting tension or compression to support stabilizing the duplex ferrule and absorbing movement to support spring floating of the duplex ferrule; and
    a receptacle connector housing aligning the duplex ferrule for blindmating with a complimentary duplex ferrule, wherein the receptacle connector housing is coupled to the carrier plate, wherein the carrier plate is a one-piece construction retaining the duplex ferrule, and the neck spring leaves are situated in a different plane than the base spring leaves to further support the spring floating of a duplex ferrule in a three-dimensional space during blindmating.

2. The duplex-modulo connector of claim 1, wherein the receptacle connector housing comprises one or more bores receiving the complimentary duplex ferrule during blindmating.

3. The duplex-modulo connector of claim 2, wherein the one or more holes includes a final alignment sleeve for aligning the complimentary duplex ferrule with respect to the duplex ferrule during blindmating.

4. The duplex-modulo connector of claim 1, wherein the neck spring leaves provide on carrier plates positive reactive force for the duplex ferrule with respect to pushing against the complimentary duplex ferrule during blindmating.

5. The duplex-modulo connector of claim 1, wherein the receptacle connector housing comprises cascading features situated on one or more lateral surfaces thereon, and interlocking with one or more additional duplex ferrule connectors such that the additional duplex ferrule connectors are mounted to the receptacle connector housing in a cascaded arrangement.

6. A duplex-modulo connector, comprising:
    a carrier plate receiving a duplex ferrule, comprising:
        an entry slot receiving the duplex ferrule;
        neck spring leaves receiving first notches situated on a neck portion of the duplex ferrule and exerting tension to support stability and absorbing movement to support spring floating of the duplex ferrule; and
        base spring leaves receiving second notches situated on a base portion of the duplex ferrule, and exerting tension to support stability and absorbing movement to support spring floating of the duplex ferrule; and
    a plug connector housing aligning the duplex ferrule for blindmating with a complimentary duplex ferrule, wherein the plug connector housing is coupled to the carrier plate, wherein the carrier plate is a one-piece construction retaining the duplex ferrule, and the neck spring leaves are situated in a different plane than the base spring leaves to further support the spring floating of a duplex ferrule in a three-dimensional space during blindmating.

7. The duplex-modulo connector of claim 6, wherein the carrier plate is copper, carbon nanotube or sheet metal.

8. The duplex-modulo connector of claim 6, wherein the plug connector housing comprises one or more bores accepting the protrusion of the duplex ferrule through the plug connector housing to be received by the complimentary duplex ferrule during blindmating.

9. The duplex-modulo connector of claim 8, wherein the complimentary ferrule is housed in a complimentary receptacle connector housing for seating against the plug connector housing.

10. The duplex-modulo connector of claim 9, wherein the spring floating provides defection of the plug connector housing in fully seating the complimentary receptacle connector housing against the plug connector housing.

11. The duplex-modulo connector of claim 9, wherein the plug connector housing comprises cascading features situated on one or more lateral surfaces thereon, and interlocking with one or more additional duplex ferrule connectors such that the additional duplex ferrule connectors are mounted to the complimentary receptacle connector housing in a cascaded arrangement.

* * * * *